US010699020B2

(12) United States Patent
Agarwal et al.

(10) Patent No.: US 10,699,020 B2
(45) Date of Patent: Jun. 30, 2020

(54) MONITORING AND ALERT SERVICES AND DATA ENCRYPTION MANAGEMENT

(71) Applicant: Oracle International Corporation, Redwood Shores, CA (US)

(72) Inventors: Amit Agarwal, Milpitas, CA (US); Srikant Krishnapuram Tirumalai, Milpitas, CA (US); Krishnakumar Sriramadhesikan, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 42 days.

(21) Appl. No.: 15/197,463

(22) Filed: Jun. 29, 2016

(65) Prior Publication Data
US 2017/0004312 A1 Jan. 5, 2017

Related U.S. Application Data

(60) Provisional application No. 62/188,401, filed on Jul. 2, 2015, provisional application No. 62/188,409, filed on
(Continued)

(51) Int. Cl.
*G06F 21/60* (2013.01)
*G06F 21/62* (2013.01)
(Continued)

(52) U.S. Cl.
CPC .......... *G06F 21/602* (2013.01); *G06F 21/629* (2013.01); *H04L 9/3263* (2013.01);
(Continued)

(58) Field of Classification Search
CPC ....... H04L 9/3263; H04L 63/10; H04L 63/20; G06F 21/602; G06F 21/629; H04W 4/003; H04W 12/02; H04W 4/12
(Continued)

(56) References Cited

U.S. PATENT DOCUMENTS 6,158,010 A 12/2000 Moriconi et al.
6,327,652 B1 12/2001 England et al.
(Continued)

FOREIGN PATENT DOCUMENTS

CN 104462982 3/2015

OTHER PUBLICATIONS

U.S. Appl. No. 14/974,836, Non-Final Office Action dated Aug. 11, 2017, 15 pages.
(Continued)

*Primary Examiner* — Jahangir Kabir
(74) *Attorney, Agent, or Firm* — Kilpatrick Townsend & Stockton LLP

(57) ABSTRACT

A centralized framework for managing the data encryption of resources is disclosed. A data encryption service is disclosed that provides various services related to the management of the data encryption of resources. The services may include managing application policies, cryptographic policies, and encryption objects related to applications. The encryption objects may include encryption keys and certificates used to secure the resources. In an embodiment, the data encryption service may be included or implemented in a cloud computing environment and may provide a centralized framework for effectively managing the data encryption requirements of various applications hosted or provided by different customer systems. The disclosed data encryption service may provide monitoring and alert services related to encryption objects managed by the data encryption service and transmit the alerts related to the encryption objects via various communication channels.

20 Claims, 22 Drawing Sheets

Related U.S. Application Data on Jul. 2, 2015, provisional application No. 62/188,424, filed on Jul. 2, 2015.

(51) Int. Cl.
| | |
|---|---|
| *H04W 4/60* | (2018.01) |
| *H04W 12/02* | (2009.01) |
| *H04L 9/32* | (2006.01) |
| *H04L 29/06* | (2006.01) |
| *H04W 4/12* | (2009.01) |

(52) U.S. Cl.
CPC ............. *H04L 63/10* (2013.01); *H04L 63/20* (2013.01); *H04W 4/60* (2018.02); *H04W 12/02* (2013.01); *H04W 4/12* (2013.01)

(58) Field of Classification Search
USPC ............ 713/164–168; 726/1–4, 16, 17
See application file for complete search history.

(56) References Cited

U.S. PATENT DOCUMENTS

| | | | |
|---|---|---|---|
| 6,820,063 B1 | 11/2004 | England et al. | |
| 7,673,323 B1 | 3/2010 | Moriconi | |
| 7,913,309 B2 | 3/2011 | Starostin et al. | |
| 7,958,226 B2 | 6/2011 | Bernardi et al. | |
| 8,688,991 B1 | 4/2014 | Sunil | |
| 8,843,734 B2* | 9/2014 | Lim | G06F 21/602 713/150 |
| 8,959,579 B2 | 2/2015 | Barton et al. | |
| 9,003,141 B2 | 4/2015 | Nielsen et al. | |
| 9,064,131 B2* | 6/2015 | Lim | H04L 9/0822 |
| 9,471,798 B2 | 10/2016 | Vepa et al. | |
| 9,519,696 B1 | 12/2016 | Roth et al. | |
| 9,858,428 B2 | 1/2018 | Barton et al. | |
| 9,882,909 B2 | 1/2018 | Awan et al. | |
| 10,104,086 B2 | 10/2018 | Manjunath et al. | |
| 10,142,371 B2 | 11/2018 | Hari et al. | |
| 10,230,732 B2 | 3/2019 | Vepa et al. | |
| 10,395,042 B2 | 8/2019 | Agarwal et al. | |
| 2002/0059471 A1 | 5/2002 | Sanghvi et al. | |
| 2002/0116406 A1 | 8/2002 | Goldick | |
| 2002/0169974 A1 | 11/2002 | Mckune | |
| 2002/0188568 A1 | 12/2002 | Nickolaisen et al. | |
| 2003/0081621 A1 | 5/2003 | Godfrey et al. | |
| 2003/0115322 A1 | 6/2003 | Moriconi et al. | |
| 2004/0107360 A1 | 6/2004 | Herrmann et al. | |
| 2005/0038881 A1 | 2/2005 | Ben-Itzhak | |
| 2005/0060549 A1 | 3/2005 | England et al. | |
| 2005/0132226 A1* | 6/2005 | Wheeler | H04L 9/088 726/4 |
| 2005/0273600 A1 | 12/2005 | Seeman | |
| 2006/0059537 A1 | 3/2006 | Alvermann et al. | |
| 2006/0106825 A1 | 5/2006 | Cozzi | |
| 2006/0265758 A1 | 11/2006 | Khandelwal et al. | |
| 2007/0143148 A1 | 6/2007 | Kol et al. | |
| 2008/0133972 A1 | 6/2008 | Verbowski et al. | |
| 2008/0134297 A1 | 6/2008 | Clinick et al. | |
| 2009/0325566 A1 | 12/2009 | Bell et al. | |
| 2010/0104099 A1 | 4/2010 | Kim | |
| 2010/0154025 A1 | 6/2010 | Esteve et al. | |
| 2010/0257372 A1 | 10/2010 | Seifert | |
| 2010/0293147 A1 | 11/2010 | Snow et al. | |
| 2011/0131275 A1 | 6/2011 | Maida-Smith et al. | |
| 2012/0036220 A1 | 2/2012 | Dare et al. | |
| 2012/0036370 A1 | 2/2012 | Lim et al. | |
| 2012/0036552 A1 | 2/2012 | Dare et al. | |
| 2012/0131164 A1 | 5/2012 | Bryan et al. | |
| 2012/0198041 A1 | 8/2012 | Black et al. | |
| 2012/0221955 A1 | 8/2012 | Raleigh et al. | |
| 2012/0260303 A1 | 10/2012 | Wollnik et al. | |
| 2013/0007245 A1 | 1/2013 | Malik et al. | |
| 2013/0073672 A1 | 3/2013 | Ayed | |
| 2013/0086626 A1 | 4/2013 | Kavantzas et al. | |
| 2013/0174216 A1* | 7/2013 | Simske | G06F 21/6209 726/1 |
| 2013/0232540 A1 | 9/2013 | Saidi et al. | |
| 2014/0007222 A1 | 1/2014 | Qureshi et al. | |
| 2014/0032691 A1 | 1/2014 | Barton et al. | |
| 2014/0040979 A1 | 2/2014 | Barton et al. | |
| 2014/0068273 A1 | 3/2014 | Sobel et al. | |
| 2014/0075568 A1 | 3/2014 | Sathyadevan et al. | |
| 2014/0109176 A1* | 4/2014 | Barton | G06F 9/45533 726/1 |
| 2014/0122677 A1 | 5/2014 | Hasegawa et al. | |
| 2014/0173700 A1 | 6/2014 | Awan et al. | |
| 2014/0189777 A1 | 7/2014 | Viswanathan et al. | |
| 2015/0081538 A1 | 3/2015 | Renard et al. | |
| 2015/0089575 A1 | 3/2015 | Vepa et al. | |
| 2015/0172321 A1* | 6/2015 | Kirti | H04L 63/20 726/1 |
| 2015/0222637 A1 | 8/2015 | Hung et al. | |
| 2015/0381581 A1 | 12/2015 | Wang et al. | |
| 2016/0011990 A1 | 1/2016 | Berengoltz et al. | |
| 2016/0162695 A1 | 6/2016 | Scafaria et al. | |
| 2016/0232374 A1* | 8/2016 | Huang | G06F 9/468 |
| 2016/0285835 A1 | 9/2016 | Linga et al. | |
| 2016/0315926 A1 | 10/2016 | Agarwal et al. | |
| 2016/0315943 A1 | 10/2016 | Manjunath et al. | |
| 2016/0315965 A1 | 10/2016 | Sastry et al. | |
| 2017/0004313 A1 | 1/2017 | Agarwal et al. | |
| 2017/0006064 A1 | 1/2017 | Agarwal et al. | |
| 2017/0019408 A1 | 1/2017 | Vepa et al. | |
| 2017/0078721 A1 | 3/2017 | Brockmann et al. | |
| 2017/0142076 A1 | 5/2017 | Ford et al. | |
| 2017/0147825 A1 | 5/2017 | Barton et al. | |
| 2017/0201850 A1 | 7/2017 | Raleigh et al. | |
| 2018/0025180 A1 | 1/2018 | Wang et al. | |
| 2018/0027006 A1 | 1/2018 | Zimmermann et al. | |
| 2018/0109538 A1* | 4/2018 | Kumar | H04L 63/08 |

OTHER PUBLICATIONS

U.S. Appl. No. 14/975,208, First Action Interview Pilot Program Pre-Interview Communication, dated Jun. 16, 2017, 3 pages.

U.S. Appl. No. 15/278,902, Non-Final Office Action dated Aug. 31, 2017, 19 pages.

U.S. Appl. No. 14/484,050, Non-Final Office Action dated Jan. 4, 2016, 14 pages.

U.S. Appl. No. 14/484,050, Notice of Allowance dated Jun. 2, 2016, 8 pages.

U.S. Appl. No. 15/136,734, First Action Interview Office Action Summary dated May 1, 2018, 7 pages.

U.S. Appl. No. 15/197,463, Applicant Initiated Interview Summary dated May 11, 2018, 3 pages.

U.S. Appl. No. 15/197,478, Applicant Initiated Interview Summary dated May 11, 2018, 3 pages.

U.S. Appl. No. 15/278,902, Final Office Action dated Apr. 20, 2018, 21 pages.

U.S. Appl. No. 15/197,472, First Action Interview Office Action Summary dated May 21, 2018, 4 pages.

U.S. Appl. No. 14/974,836, Advisory Action dated Mar. 22, 2018, 3 pages.

U.S. Appl. No. 14/974,836, Final Office Action dated Dec. 27, 2017, 15 pages.

U.S. Appl. No. 14/975,208, First Action Interview Pilot Program Pre-Interview Communication dated Dec. 15, 2017, 5 pages.

U.S. Appl. No. 15/136,734, First Action Interview Pilot Program Pre-Interview Communication dated Mar. 5, 2018, 7 pages.

U.S. Appl. No. 15/197,478, Non-Final Office Action dated Feb. 7, 2018, 21 pages.

U.S. Appl. No. 14/974,836, Notice of Allowance dated Jul. 30, 2018, 8 pages.

U.S. Appl. No. 14/975,208, Notice of Allowance dated Jun. 21, 2018, 7 pages.

U.S. Appl. No. 15/136,734, Notice of Allowance dated Aug. 28, 2018, 14 pages.

U.S. Appl. No. 15/197,472, First Action Interview Office Action Summary dated Jul. 18, 2018, 6 pages.

(56) References Cited

OTHER PUBLICATIONS

U.S. Appl. No. 15/197,478, Advisory Action dated Sep. 13, 2018, 3 pages.
U.S. Appl. No. 15/197,478, Final Office Action dated Jun. 29, 2018, 24 pages.
U.S. Appl. No. 15/278,902, Advisory Action dated Jul. 13, 2018, 3 pages.
"About Active Directory Group Policy Container Settings", Retrieved From Internet: https://www.vmware.com/support/vcm/doc/help/vcm581/Content/ActiveDir_CS/AD_Group_Policy_Objects.htm, Accessed from Internet on Oct. 8, 2018, 1 page.
Mar-Elia; Darren, "What's wrong with Group Policy?", IT Pro Today, Retrieved From Internet: https://www.itprotoday.com/compute-engines/whats-wrong-group-policy, Jul. 14, 2011, 14 pages.
Srachui, "Group Policy Basics—Understanding the Structure of a Group Policy Object", Microsoft, TechNet, Feb. 13, 2012, 10 pages. Retrieved From Internet https://blogs.technet.microsoft.com/musings_of_a_technical_tam/2012/02/13/group-policy-basics-part-1-Understanding-the-structure-of-a-group-policy-object/.
"Understanding Group Policy Storage", SDM Software, Retrieved From Internet: https://sdmsoftware.com/gpoguy/whitepapers/Understanding-group-policy-storage/, Accessed from Internet on Oct. 8, 2018, 3 pages.
U.S. Appl. No. 15/197,478, Non-Final Office Action dated Nov. 5, 2018, 25 pages.
U.S. Appl. No. 15/278,902, Notice of Allowance dated Oct. 24, 2018, 11 pages.
U.S. Appl. No. 15/197,472, Non-Final Office Action dated Mar. 27, 2019, 19 pages.
U.S. Appl. No. 15/197,472, Final Office Action dated Nov. 9, 2018, 17 pages.
U.S. Appl. No. 16/211,540, Non-Final Office Action dated Oct. 18, 2019, 22 pages.
U.S. Appl. No. 15/197,478, Notice of Allowance dated Apr. 19, 2019, 18 pages.
U.S. Appl. No. 15/197,472, Notice of Allowance dated Jul. 23, 2019, 10 pages.

\* cited by examiner

| APPLICATION | APPLICATION POLICY(S) | POLICY CONDITION(S) | POLICY ACTION(S) |
|---|---|---|---|
| A1 | P1 | {C1} | {ACTION 1} |
| A2 | P2 | {C1, C2} | {((C1-> ACTION 1) (C2->ACTION 2)} |
| A3 | P3 | {C1, C2} | {((C1-> ACTION 1) (C2->ACTION 2)} |

*FIG. 2*

| Application | Application Policy(s) | Policy Condition(s) | Policy Action(s) | Cryptographic Policy |
|---|---|---|---|---|
| A1 | P1 | {C1} | {Action 1} | {Asymmetric encryption algorithm} |
| A2 | P2 | {C1, C2} | {(C1-> Action 1) (C2->Action 2)} | {(Secure Hash Algorithm-1, when C1 is satisfied), (Secure Hash Algorithm-2 when C2 is satisfied)} |
| A3 | P3 | {C1, C2} | {(C1-> Action 1) (C2->Action 2)} | {(Symmetric Encryption algorithm, when C1 is satisfied), (Asymmetric encryption algorithm when C2 is satisfied)} |

FIG. 3

| Application | Application Policy(s) | Policy Condition(s) | Policy Action(s) | Cryptographic Policy | Encryption Object |
|---|---|---|---|---|---|
| A1 | P1 | {C1} | {Action 1} | {Asymmetric encryption algorithm} | 1024 bit RSA encryption key |
| A2 | P2 | {C1, C2} | {(C1-> Action 1) (C2->Action 2)} | {(Secure Hash Algorithm-1, when C1 is satisfied), (Secure Hash Algorithm-2 when C2 is satisfied)} | {(160-bit hash value, when C1 is satisfied), (224-bit hash value when C2 is satisfied)} |
| A3 | P3 | {C1, C2} | {(C1-> Action 1) (C2->Action 2)} | {(Symmetric encryption algorithm, when C1 is satisfied), (Asymmetric encryption algorithm when C2 is satisfied)} | {(Stream Cipher, when C1 is satisfied), (Digital Signature Algorithm when C2 is satisfied)} |

*FIG. 4*

MONITORING AND ALERT SERVICES AND DATA ENCRYPTION MANAGEMENT

CROSS-REFERENCES TO RELATED APPLICATIONS

The present application claims the benefit and priority to Provisional Patent Application No. 62/188,401, filed Jul. 2, 2015, entitled, "MONITORING SYSTEM FOR KEYS AND CERTIFICATES," Provisional Patent Application No. 62/188,409, filed Jul. 2, 2015, entitled, "GOVERNANCE POLICIES FOR KEY MANAGEMENT SYSTEM," and Provisional Patent Application No. 62/188,424, filed Jul. 2, 2015, entitled, "DATA ENCRYPTION SERVICE WITH CUSTOM ENCRYPTION KEYS," the entire contents of which are each hereby incorporated herein by reference for all purposes.

This application is also related to application Ser. No. 15/197,478, entitled "DATA ENCRYPTION SERVICE," and application Ser. No. 15/197,472, entitled "DATA ENCRYPTION SERVICE AND CUSTOMIZED ENCRYPTION MANAGEMENT," each filed on the same day as the present application, the entire contents of each are incorporated herein by reference for all purposes.

BACKGROUND

Data encryption is an effective technique by which secure access to computing resources can be provided. These resources may include, for example, software products, applications (e.g., cloud-based applications, enterprise applications, or any other applications), cloud services, various types of data (e.g., networked files, directory information, databases, or the like) and other resources. For instance, an organization may utilize various data encryption techniques to ensure secure access to computing resources by users of the organization. Managing the secure access to these different resources may pose several challenges. For instance, different subsystems within an organization may utilize different resources that have to be encrypted according to different encryption requirements based on the types of services they provide. For example, business analytics services within an organization may utilize resources that have to be encrypted differently from financial services within the organization. As such, finding ways for managing the data encryption of resources continues to be a priority.

BRIEF SUMMARY

Techniques are provided (e.g., a method, a system, non-transitory computer-readable medium storing code or instructions executable by one or more processors) for managing the data encryption of resources. The resources may include, for instance, software products, applications (e.g., cloud-based applications, enterprise applications, or any other applications), cloud services, various types of data (e.g., networked files, directory information, databases, or the like) and other resources. In some embodiments, the resources may be provided, managed, hosted, or stored by external systems such as third-party systems, organizations, application hosting systems, application providers, cloud service providers, and the like.

In an embodiment, a data encryption service is disclosed that provides a centralized framework for managing the data encryption of resources. The data encryption service provides various services related to the management of the data encryption of resources. These services may include, for instance, managing application policies, cryptographic policies, and encryption objects (e.g., encryption keys and/or certificates) related to applications. In an embodiment, the applications may be hosted, provided, or otherwise stored in external systems as described above.

In some embodiments, the disclosed data encryption service may be configured to provide monitoring and alert services related to encryption objects managed by the data encryption service. The monitoring and alert services may include transmitting alerts related to the encryption objects via various communication channels when one or more conditions related to the encryption objects are satisfied. The data encryption service may be configured to transmit the alerts via one or more communication channels such as email, Instant Messaging (IM), Short Message Service (SMS), Multimedia Message Service (MMS) Application-to-Application messaging, and the like.

In certain embodiments, the disclosed data encryption service may be configured to identify an encryption object related to an application and extract metadata information related to the encryption object. Metadata information related to the encryption object may include non-secure information related to an encryption object such as information related to one or more attributes of the encryption object and information related to one or more values of the attributes.

In certain embodiments, the disclosed data encryption service may be configured to identify one or more attributes associated with the encryption object to be exposed based on the metadata information. In some examples, the attributes may include, without limitation, a name of the encryption object, an activation date of the encryption object, an expiration date of the encryption object, a size of the encryption object, user groups associated with the encryption object, a version of the encryption object, a roll over date of the encryption object, and a renewal date of the encryption object.

In certain embodiments, the data encryption service may be configured to generate a set of one or more rules related to the one or more attributes and generate an alert related to the attributes based on an execution of the set of one or more rules. The data encryption service may then be configured to transmit the alert to one or more users, via one or more communication channels. In some examples, the rules may define a set of one or more conditions to be applied to the attributes to monitor the one or more attributes. In an embodiment, the data encryption service may be configured to generate the alert related to the attributes when at least one condition specified by the set of one or more rules is satisfied. In some examples, the data encryption service may be configured to receive a definition of the set of one or more rules based on an input received from a user (e.g., an administrator) of the system. In some examples, the data encryption service may be configured to generate an alert for the encryption object based on identifying a violation of an application policy defined for the application associated with the encryption object. In some examples, and as noted above, the data encryption service may be configured to transmit the alert via at least one of email, Instant Messaging (IM), Short Message Service (SMS), Multimedia Message Service (MMS), and Application-to-Application messaging.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 2 is an exemplary illustration of a mapping of applications to application policies, in accordance with an embodiment of the present disclosure.

FIG. 3 is an exemplary illustration of a mapping of applications to application policies and cryptographic polices, in accordance with an embodiment of the present disclosure.

FIG. 4 is an exemplary illustration of a mapping of applications to application policies, cryptographic polices, and encryption objects, in accordance with an embodiment of the present disclosure.

DETAILED DESCRIPTION

Figure 1:
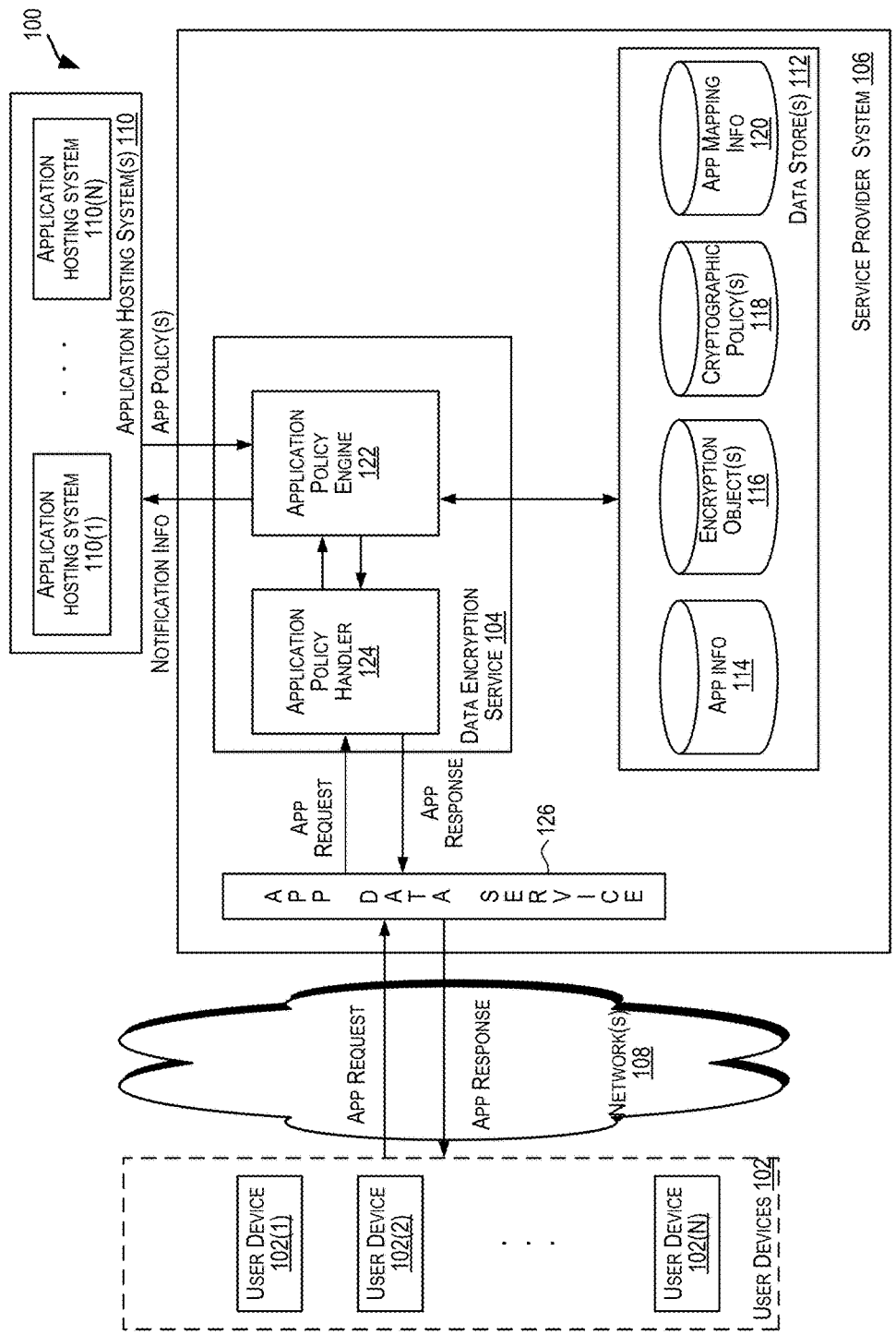
FIG. 1 illustrates an example block diagram of a computing environment 100 for providing data encryption services in accordance with certain embodiments of the present disclosure.

In the following description, for the purposes of explanation, specific details are set forth in order to provide a thorough understanding of embodiments of the disclosure. However, it will be apparent that various embodiments may be practiced without these specific details. The figures and description are not intended to be restrictive. Systems depicted in some of the figures may be provided in various configurations. In some embodiments, the systems may be configured as a distributed system where one or more components of the system are distributed across one or more networks in a cloud computing system.

In an embodiment, a data encryption service is disclosed that provides a centralized framework for managing the data encryption of resources. The data encryption service provides various services related to the management of the data encryption of resources. These services may include, for instance, managing application policies, cryptographic policies, and encryption objects (e.g., encryption keys and/or certificates) related to applications. In an embodiment, the applications may be hosted, provided, or otherwise stored in external systems as described above.

In some embodiments, the data encryption service may be included or implemented in a cloud computing environment. Such a cloud computing environment can include separate identity domains that are isolated from each other. Each identity domain can be associated with a separate tenant, or customer system, such as a different business organization. In such a cloud computing environment, each customer system can individually use the data encryption service in the cloud computing environment to secure their individual customer systems as per their business application and corporate needs.

In some embodiments, the data encryption service provides a centralized framework for effectively managing the data encryption requirements of various applications hosted or provided by different customer systems. The disclosed data encryption service provides various interfaces for users of the customer systems to interact with and utilize the services of the data encryption service. In some examples, the users may utilize these interfaces to provide and/or select the appropriate customer-specific information such as application policies and encryption objects related to applications provided by the customer systems. The disclosed data encryption service may be configured to store application policies, cryptographic policies, and encryption objects related to applications managed by the various customer systems in different customer-specific data stores.

In certain embodiments, the disclosed data encryption service may be configured to receive an application policy related to an application and determine the appropriate encryption to be applied to data in the application based on the application policy. In some embodiments, the data encryption service may be configured to determine a cryptographic policy to be applied to encrypt the data in the application in accordance with the application policy and acquire the appropriate encryption objects (e.g., encryption keys and/or certificates) for encrypting the data in the application in accordance with the cryptographic policy and the application policy.

In certain embodiments, the disclosed data encryption service may be configured to perform the encryption of data in the application at runtime based, for example, on a request received from a user. The data encryption service may be configured to determine the appropriate encryption to be applied to the data in the application based on the application policy, the cryptographic policy, and the encryption objects related to the application and transmit an encrypted version of the data in the application to the user on a user device.

In accordance with certain embodiments of the present disclosure, the disclosed data encryption service may be configured to provide monitoring and alert services related to encryption objects (e.g., encryption keys and certificates) managed by the data encryption service. The monitoring and alert services may include transmitting alerts related to the encryption objects via various communication channels when one or more conditions related to the encryption objects are satisfied. The data encryption service may be configured to transmit the alerts via one or more communication channels such as email, Instant Messaging (IM), Short Message Service (SMS), Multimedia Message Service (MMS) Application-to-Application messaging, and the like. Additional details of the operations performed by the data encryption service are discussed in detail below.

Data Encryption Service

FIG. 1 illustrates an example block diagram of a computing environment 100 for providing data encryption services in accordance with certain embodiments of the present disclosure. As shown, computing environment 100 includes user devices 102(1)-102(N) (collectively, user devices 102) communicatively coupled to a service provider system 106 via a communication network 108. In an embodiment, service provider system 106 may be a data encryption system configured to provide data encryption services for the users of user devices 102. Communication network 108 facilitates communications between user devices 102 and service provider system 106. Communication network 108 can be of various types and can include one or more communication networks. For example, communication network 108 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as WebSockets that provide a full-duplex communication channel over a single TCP connection, IEEE 802.XX suite of protocols, TCP/IP, IPX, SAN, AppleTalk, Bluetooth, and other protocols. In general, communication network 108 may include any communication network or infrastructure that facilitates communications between user devices 102 and service provider system 106.

User devices 102 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, user devices 102 may be any other electronic device, such as a thin-client computer, Internet-enabled gaming system, and/or personal messaging device, capable of communicating over a network (e.g., network 108). Although exemplary system environment 100 is shown with three user devices, any number of user and/or client computing devices may be supported, in other embodiments.

Service provider system 106 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up service provider system may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In some embodiments, service provider system 106 may be implemented as an enterprise computing system or a cloud computing system comprising one or more computers and/or servers that may include those described above. Service provider system 106 may include several subsystems and/or modules, including some, which may not be shown. For example, service provider system 106 may include a data encryption service 104, one or more data stores 112 and an application data service 126. Service provider system 106 may have more or fewer subsystems and/or modules than shown in the figure, may combine two or more subsystems and/or modules, or may have a different configuration or arrangement of subsystems and/or modules. Subsystems and modules of service provider system 106 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

As noted above, in certain embodiments, service provider system 106 may include a data encryption service 104. Data encryption service 104 may be configured to provide data encryption services to the users of service provider system 106. For instance, users of service provider system 106 could include application hosting systems 110 that host, manage, provide, and/or store resources such as software products, applications (e.g., cloud-based applications, enterprise applications, or any other applications), cloud services, various types of data (e.g., networked files, directory information, databases, or the like) and other resources. Users of service provider system 106 could also include users of user devices 102 who wish to interact with and utilize applications hosted by the application hosting systems or applications stored in the service provider system. In some embodiments, the data encryption services provided by data encryption service 104 may include, for instance, managing application policies, cryptographic policies, and encryption objects (e.g., encryption keys and/or certificates) related to applications hosted by, managed by, or otherwise stored in application hosting systems 110.

Data stores 112 can be implemented using a database (e.g., a document database, a relational database, or other type of database), a file store, a combination thereof, or some other information store. In an embodiment, data stores 112 may include an application information data store 114, an encryption object data store 116, a cryptographic policies data store 118, and an application mapping information data store 120. Application information data store 114 may store information related to a variety of applications hosted by, provided by, managed by or otherwise stored in application hosting systems 110. The information stored in application data store 114 could include, for example, an application identifier, an application name, an application version and application policies related to one or more applications. As noted above, applications may include, for instance, cloud-based applications, enterprise applications, cloud services, various types of data (e.g., networked files, directory information, databases, or the like), word processors, spreadsheets, accounting applications, web browsers, web applications, messaging services, native applications, data management applications (e.g., file systems, object storage systems, backup systems like Network Attached Stores, backup system or the like) or any other applications.

Encryption objects data store 116 may store information related to a variety of encryption objects such as encryption keys and certificates. Encryption objects data store 116 may also store metadata related to the encryption objects, such as, for example, the type of encryption object, the strength of the encryption object, the expiration date of the encryption object, the issuance or creation date of the encryption object, and the like. As described herein, an encryption key refers to a variable value that is applied to a string or block of unencrypted text using an algorithm to produce encrypted text, or a variable value that is applied to decrypt encrypted text. A certificate may refer to an electronic document such as a public key certificate (e.g., a digital certificate, or an identity certificate) that can be used to prove ownership about an owner's identity. A certificate may include information about a key, information about its owner's identity, and the digital signature of an entity that has verified that the certificate's contents are correct.

Cryptographic policies data store 118 may store information related to a variety of cryptographic policies. Cryptographic policies may specify, for instance, a particular cryptographic algorithm to be used to secure an application or portions of the application. Cryptographic policies may specify the types of encryption objects (e.g., encryption keys and/or certificates) to be used to encrypt applications. Cryptographic algorithms may include, for example, encryption algorithms, signing algorithms, hashing algorithms, and the like. Examples of encryption algorithms may include, for instance, symmetric algorithms, asymmetric algorithms, stream ciphers, key strength algorithms, and the like. Symmetric algorithms (also known as shared key algorithms) may involve the use of symmetric-key schemes, in which the encryption key is the same as the decryption key. Thus, communicating parties must have the same key before they can achieve secure communication. Asymmetric algorithms (also known as public key algorithms) may use different keys for encryption and decryption. Examples of asymmetric algorithms may include, the RSA algorithm, Digital Signature Algorithm, and the like. In some embodiments, cryptographic policies may also include hashing algorithms. Hashing refers to a form of cryptographic security in which a message is typically condensed into an irreversible fixed-length value, called a hash. Examples of hashing algorithms may include, SHA-1, MD5 and the like.

In some examples, cryptographic policies data store 118 may store information related to a type of initialization vector (i.e., an arbitrary number that can be used along with a secret key for data encryption) to use during data encryption, a type of key coding that is to be used while returning keys and/or certificates to a requester, algorithmic specific values such as the number of iterations and modes of operation used by cryptographic algorithms to encrypt data (such as cipher block chaining modes and padding modes) and the like. In other examples, cryptographic policies data store 118 may store information related encryption objects such as certificate validity, key validity, key usage, key rollover policies, certificate auto-renewal policies, and so on.

In some embodiments, application mapping information data store 120 may be configured to store a variety of information that associates and/or maps applications to their application policies, cryptographic policies, and encryption objects. For instance, application mapping information data store 120 may pre-compute and store such mapping information in situations where the data encryption service is required to handle a large volume of requests and a diverse nature of requests from users who wish to utilize the services of the data encryption service. When a new application arrives to the data encryption service, application mapping information data store 120 may utilize the stored information to determine the appropriate mapping to be applied to the application based on its application policy, cryptographic policy, and encryption objects. FIGS. 2-4 are exemplary illustrations of various types of information that may be stored in application mapping information data store 120, in accordance with an embodiment of the present disclosure.

Application hosting systems 110(1)-110(N) (collectively, application hosting systems 110) may represent external systems that can provide, host, manage or store applications. For instance, application hosting systems 110 may represent a cloud service provider, a third-party system, or an organization that can host a variety of applications. As noted above, these applications may include, for instance, cloud-based applications, enterprise applications, cloud services, various types of data (e.g., networked files, directory information, databases, or the like), word processors, spreadsheets, accounting applications, web browsers, web applications, messaging services, native applications, or any other applications. The applications may also include, for instance, Business Applications (SaaS e.g. Customer Experience Suite, Benefits and Compensation suite etc.), Platform services (PaaS—like Oracle's Data Visualization Cloud etc.), Infrastructure services (IaaS—like compute, storage systems, Load balancing systems etc.) While not shown in FIG. 1, application hosting systems 110 may also be communicatively coupled to service provider system 106 via communication network 108.

Application hosting systems 110 may be implemented or included in a computing system. Application hosting systems 110 may be implemented in hardware, firmware, software, or combinations thereof. Application hosting systems 110 may be implemented in a computing device, such as a PDA, a tablet computer, a laptop computer, a desktop computer, a wearable computer, a pager, etc. Application hosting systems 110 can be implemented using one or more memory storage devices and one or more processors. A memory storage device can be accessible to the processor(s) and can include instructions stored thereon which, when executed by the processor(s), cause the processor(s) to implement one or more operations disclosed herein.

In certain embodiments, application hosting systems 110 may interact with data encryption service 104 to utilize the services provided by the data encryption service. For instance, in an embodiment, a user (e.g., a system administrator) of an application hosting system 110 may interact with data encryption service 104 by transmitting a request to the data encryption service. The request may include, for instance, an application policy related to an application. There are various ways in which application hosting system 110 may transmit a request to data encryption service 104. For instance, a user (e.g., a system administrator) of application hosting system 110 may interact with a browser application executed by the application hosting system and the interaction may cause the browser application to generate a request to data encryption service 104. In an example, the request may include an application policy related to an application hosted by application hosting system 110. In other examples, a request to the data encryption service may be automatically generated by a provisioning system within the application hosting system that provisions applications for the application hosting system. For instance, the provisioning system may make an application programming interface (API) call to the data encryption service to request that a set of policies be bound to the application being provisioned by the provisioning system The application policy may include information regarding the manner in which an application, portions of the application and/or data created and/or manipulated by the application are to be secured. An application policy can specify a set of conditions that indicate when an application policy for an application is applicable and a set of actions that are to be performed when one or more of the conditions are satisfied. For example, an application policy for an email application may specify that a user's password should meet a certain criterion (i.e., include a specific number of characters and/or be of a specific length) when the user logs into the email application.

In certain examples, an application policy may specify the manner in which data in an application has to be secured when a set of users access the application or portions of the application. For instance, the application policy can specify that the data in an application should be encrypted with an encryption key of a particular key strength and/or key length when the application is being accessed by a manager of an organization and encrypted using an encryption key of a different strength when the application is accessed by an end-user of the organization. Application policies may also specify for instance, how a particular application or portions of the application are required to be secured. For instance, an application policy can specify that data in an application requires to be secured using a hashing algorithm, or that the data in an application requires to be secured using an encryption key and/or a certificate that needs to be refreshed at pre-determined intervals of time.

Upon receiving an application policy for an application as described above, data encryption service 104 may perform the data encryption related to the application. For instance, in an embodiment, based upon the application policy, data encryption service 104 may identify portions of data in the application that are to be encrypted and determine an appropriate cryptographic policy to be applied to the data in the application or portions of the data in the application based on the application policy. In certain embodiments, data encryption service 104 may determine the appropriate encryption objects (e.g., encryption keys and/or certificates) to be acquired for encrypting the data in the application based on the cryptographic policy and the application policy.

In an embodiment, data encryption service 104 may include an application policy engine 122 and an application policy handler 124. These modules may include or be provided using one or more computers and/or servers which may be general purpose computers, specialized server computers, server farms, server clusters, or any other appropriate arrangement and/or combination. The various modules of data encryption service 104 depicted in FIG. 1 are meant for illustrative purposes only and are not intended to limit the scope of embodiments of the present disclosure. Alternative embodiments may include more or fewer modules than those shown in FIG. 1.

Application policy engine 122 may be configured to receive an application policy for an application (e.g., from a user of application hosting system 110) and identify portions of the application that have to be secured based on the application policy. For instance, application policy engine 122 may be configured to receive an application policy for a financial application from the user of application hosting system 100 and identify based on the application policy that a first portion of data in the application comprises information related to compensation and benefits and that a second portion of data in the application comprises information related to sales data analytics. In certain embodiments, application policy engine 122 may then be configured to create a mapping between the application and its application policy. An example of a mapping of an application to its application policy by application policy engine 122 is shown in FIG. 2.

Application policy engine 122 may then be configured to determine a cryptographic policy for securing the data in the application or identified portions of the data in the application, based on the application policy. For instance, application policy engine 122 may be configured to interact with cryptographic policies data store 118 to retrieve the appropriate cryptographic policy to apply to the data in the application or portions thereof, based on the application policy. For instance, continuing with the example of the financial application discussed above, application policy engine 122 may be configured to determine, based on the application policy, that a portion of the data in the application that relates to compensation and benefits has to be encrypted using an encryption algorithm that uses a signing algorithm, whereas a portion of the data in the application that relates to sales data analytics has to be encrypted using an encryption algorithm that uses an asymmetric encryption algorithm. In some embodiments, application policy engine 122 may be configured to create a mapping between an application, its application policy and the cryptographic policy to be used to encrypt the application. An example of a mapping of an application to its application policy and cryptographic policy by application policy engine 122 is shown in FIG. 3.

In some embodiments, application policy engine 122 may be configured to determine the appropriate encryption objects (e.g., encryption keys and/or certificates) to be acquired for encrypting the data in the application or portions thereof, in accordance with the cryptographic policy and the application policy. For instance, application policy engine 122 may be configured to determine, based on the cryptographic policy and the application policy, that an encryption key, $E_K$ of 128 bit strength is required to be used to encrypt the portion of the data in the application that relates to compensation and benefits whereas an RSA key, $E_K$ of 1024 bit strength is required to be used to encrypt the portion of the data in the application that relates to sales data analytics. Application policy engine 122 may then be configured to acquire the appropriate encryption key for securing the data in the application or portions thereof. For instance, application policy engine 122 may transmit a request to encryption objects data store 116 to retrieve the appropriate encryption key from encryption objects data store 116. If application policy engine 122 determines that the encryption object (e.g., encryption key and/or certificate) is not available in encryption objects data store 116, then in some embodiments, application policy engine 122 may be configured to generate the appropriate encryption object to be used to secure the data in the application or portions thereof and store the generated encryption object in the encryption objects data store. In some embodiments, the encryption objects may be stored in application hosting systems 110 and application policy engine 122 may also be configured to acquire the relevant encryption objects to encrypt the data in the application from application hosting systems 110.

In certain embodiments, application policy engine 122 may be configured to create a mapping between an application, its application policy, its cryptographic policy and the encryption object (e.g., encryption keys and/or certificates) to be used to secure the data in the application. An example of a mapping of an application to its application policy, cryptographic policy, and encryption object is shown in FIG. 4. In an embodiment, the mapping of information between applications, application policies, cryptographic policies and encryption objects is stored in application mapping information database 120.

Application policy handler 124 may be configured to perform the encryption of data in an application at runtime based, for example, on a request received from a user of user device 102. For instance, application policy handler 124 may determine, at runtime, the appropriate encryption to be applied to the data in the application by interacting with application policy engine 122 to determine the appropriate application policy, the cryptographic policy, and the encryption objects to be applied to the application. Application policy handler 124 may perform the encryption of the data in the application, at run time, based on the application policy, the cryptographic policy, and the encryption object and transmit an encrypted version of the application's data to the user on user device 102 via application data service 126.

There are various ways in which application policy handler 124 may be configured to receive a request from user device 102. In one instance, a request may be generated as a result of a user's interactions with user device 102. For example, a user may interact with a browser application executed by user device 102 and the interaction may cause the browser application to generate a request that is transmitted to application policy handler 124. In an embodiment, the request may be a request from the user to access an application via user device 102. For example, the application may be a mobile application hosted by or provided by application hosting system 110 that is preloaded onto the user's device. Or, for example, the application may be an application that is obtained by the user by downloading the application from the Internet or by downloading the application from an online store. The application may include, for example, a word processor, a database program, a web browser, an email application, a tax application, a directory application, an expense report application, a log-in application, a library application, a customer relationship management (CRM) software application, or the like.

In some embodiments, the request may be received by application data service 126 in service provider system 106 which may then transmit the request to application policy handler 124. Application data service 126 may be configured to provide application services (e.g., receiving and responding to requests related to applications) to users of user devices 102. In one instance, application data service 126 may be configured to provide application services to the users via a SaaS platform. The SaaS platform may be configured to provide services that fall under the SaaS category. The SaaS platform may manage and control the underlying software and infrastructure for providing the SaaS services. By utilizing the services provided by the SaaS platform, users of user devices 102 can utilize applications accessible by service provider system 106, which, in an embodiment, can be implemented as a cloud infrastructure system. Thus, users can acquire the application services provided by the service provider system without the need for the users to purchase separate licenses and support. Various different SaaS services may be provided. In one embodiment, users of user devices 102 may utilize application data service 120 to utilize the data encryption services provided by subsystems and/or modules of the service provider system.

In certain embodiments, application policy engine 122 may transmit notification information to application hosting systems 110. Notification information may be transmitted at pre-determined intervals of time to the application hosting systems. The pre-determined intervals of time may be determined by a system administrator of service provider system 106 or automatically determined by application policy engine 122. Notification information that is transmitted may include, for instance, when an encryption key associated with an application should be rolled over as per the application policy, when an application policy for an application should be renewed, when an application policy for an application will expire and the like.

FIG. 2 is an exemplary illustration of a mapping of applications to application policies, in accordance with an embodiment of the present disclosure. In an embodiment, the mapping of applications to application policies may be performed by application policy engine 122 in data encryption service 104. In one example, the mapping of an application to an application policy may include determining one or more conditions associated with the application policy that specify when an application policy for an application is applicable. The mapping of an application to an application policy may further include identifying one or more actions to be performed when one or more of the conditions are satisfied. For instance, application policy engine 122 may determine that an application policy P1 for an application A1 is applicable when a user accesses the application A1. Thus, application policy engine 122 may determine that the user's access to the application A1 is a condition (C1) that makes the application policy P1 applicable to application A1. Application policy engine 122 may then identify, based on the application policy P1, that the data in the application is to be encrypted using an encryption key of a particular strength when the condition C1 is satisfied. Thus, application policy engine 122 may determine that the 'action' to be performed is the encryption of the data in the application using an encryption key of a particular strength when the user accesses the application. In some embodiments, application policy engine 122 may identify at least a portion of the data in the application to be encrypted based on the conditions and actions associated with the application policy.

In some instances, application policy engine 122 may determine that a first condition C1 and a second condition C2 are associated with an application policy (e.g., P2) for an application (e.g., A2). For instance, application policy engine 122 may determine that a first condition C1 is associated with the application policy P2 when a first set of users access the application A2 and that a second condition C2 is associated with the application policy P2 when a second set of users access the application A2. The first set of users may be different from the second set of users. For instance, the first set of users may include administrative entities in an organization and the second set of users may include end-users of the organization. Application policy engine 122 may then identify, based on the application policy P2, a first action A1 that specifies that the data in the application A2 is to be encrypted using an encryption key of a specific strength when the first set of users access the application and a second action A2 that specifies that the data in the application A2 is to be encrypted using an encryption key of a different strength when the second set of users access the application.

In some examples, application policy engine 122 may determine that a first condition C1 is associated with an application policy (e.g., P3) for an application (e.g., A3) when a user accesses a first portion of the data in the application and that a second condition C2 is associated with the application policy P3 when the user accesses a second portion of the data in the application that is different from the first portion. Application policy engine 122 may then identify, based on the application policy P3, a first action A1 that is to be performed when the user accesses the first portion of the data in the application and a second action A2 to be performed when the user accesses the second portion of the data in the application. For instance, the actions A1 and A2 may specify that the data in the application A3 is to be encrypted using an encryption key of a particular strength depending on whether the user accesses the first portion or the second portion of the data in the application.

It is to be appreciated that the mapping of applications to application policies illustrated in FIG. 2 is not intended to limit the scope of the present disclosure but is merely discussed to provide examples of the manner in which applications may be mapped to application policies. Additional mappings and/or different mappings between applications, application policies and conditions applicable to application policies may be identified and/or applied to applications, in other embodiments.

For instance, a cloud service may be owned and operated by a customer system. In certain situations, the customer may wish to delegate the operation of its cloud service to a cloud vendor, while still maintaining the use and ownership of the service. In such a model, users (e.g., an administrator) of the cloud service should be able to perform administrative actions to start/stop/patch/upgrade/monitor the service itself, but not be able to access data used by the cloud service when the customers of the customer system use the cloud service. An appropriate application policy can identify which data is sensitive and needs encryption. A cryptography policy can identify what algorithms, key strengths, encryption mode is to be used. At runtime, depending on whether an application is being used by a user of the customer system or a user of the cloud vendor, the data encryption service can determine the appropriate encryption to be applied to the data in the application. Additionally, the data encryption service can determine if the user must be returned access to the decrypted data or not. One of ordinary skill in the art would recognize many variations, modifications, and alternatives.

FIG. 3 is an exemplary illustration of a mapping of applications to application policies and cryptographic polices, in accordance with an embodiment of the present disclosure. In an embodiment, the mapping of applications to application policies and cryptographic polices may be performed by application policy engine 122 in data encryption service 104. There are various ways in which a cryptographic policy can be mapped to an application based on its application policy. For instance, per the example discussed in FIG. 2, application policy engine 122 may determine that the cryptographic policy to be mapped to an application should be an asymmetric encryption algorithm (e.g., RSA) based on the application policy (e.g., P1) associated with the application (e.g., A1).

In certain examples, application policy engine 122 may determine, based on the application policy P2 associated with the application A2, that a cryptographic policy based on a first hash function (Secure Hash Algorithm-1) is to be applied when a first condition C1 is associated with the application policy P2 is satisfied and that a cryptographic policy based on a second hash function (Secure Hash Algorithm-2) is to be applied when a second condition C2 is associated with the application policy P2 is satisfied.

In another example, application policy engine 122 may determine, based on the application policy P3 associated with the application A3, that a first portion of the data in the application (e.g., a portion of the application that relates to compensation and benefits) is to be encrypted using a cryptographic policy that uses a symmetric encryption algorithm, whereas a second portion of the data in the application (e.g., a portion of the application that relates to sales data analytics) is to be encrypted using a cryptographic policy that uses an asymmetric encryption algorithm.

For instance, application policy engine 122 may determine, based on an application policy of an application (e.g., a storage application) that the data in the application should be encrypted with a cryptographic policy that uses a symmetric key based on AES-256 that can be used to encrypt/decrypt data written to block storage. In addition, application policy engine 122 can determine that the key needs to be minimally unique to each customer and specific to each storage volume. It is to be appreciated that the associations of applications to their application policies and cryptographic policies illustrated in FIG. 3 are not intended to limit the scope of the present disclosure but are merely discussed to provide examples of the manner in which policies related to an application may be applied. Additional and/or different mappings between applications, application policies and cryptographic policies may be identified and/or applied, in other embodiments. One of ordinary skill in the art would recognize many variations, modifications, and alternatives.

FIG. 4 is an exemplary illustration of a mapping of applications to application policies, cryptographic polices, and encryption objects, in accordance with an embodiment of the present disclosure. In an embodiment, the mapping of applications to application policies, cryptographic polices, and encryption objects may be performed by application policy engine 122 in data encryption service 104. There are various ways in which an encryption object (e.g., encryption keys and/or certificates) can be applied to the data in an application based on its application policy and cryptographic policy. For instance, per the example discussed in FIGS. 2 and 3 above, application policy engine 122 may determine that a 1024 bit RSA encryption key is to be used to secure the data in the application A1 based on its application policy P1 and based on determining that a cryptographic policy based on an asymmetric encryption algorithm (e.g., RSA) is to be applied to the data in the application based on the application policy P1.

Continuing with the example discussed in FIGS. 2 and 3, application policy engine 122 may determine, based on the application policy P2 and the cryptographic policy (e.g., Secure Hash Algorithm-1) associated with the application A2 that a 160-bit hash value is to be used to encrypt the data in the application A2 when the first condition C1 associated with the application policy P2 is satisfied. Application policy engine 122 may further determine, based on the application policy P2 that a 224-bit hash value is to be used to encrypt the data in the application A2 when the second condition C2 associated with the application policy P2 is satisfied.

Further, based on the example discussed in FIGS. 2 and 3, application policy engine 122 may determine, based on the application policy P3 and the cryptographic policy (e.g., Symmetric encryption Algorithm) associated with the application A3 that a stream cipher is to be used to encrypt the data in the application A3 when the first condition C1 associated with the application policy P3 is satisfied. Application policy engine 122 may further determine, based on the application policy P3 that digital signature algorithm (DSA) is to be used to secure the data in the application A3 when the second condition C2 associated with the application policy P3 is satisfied As another example, application policy engine 122 may determine, based on the application policy P3 and the cryptographic policy (e.g., Symmetric encryption Algorithm) associated with an application that personal health information (PHI) and Personally identifiable information (PII) in the application might need to be encrypted differently depending on whether it is at rest or it is in motion (transmission over a network). In motion, the application policy engine may determine based on the application policy that the network must minimally use a particular cipher suite of a particular cipher strength. At rest, the application policy engine may determine that the application's data might need to be encrypted with a different cipher strength.

It is to be appreciated that the associations of applications to their application policies, cryptographic policies, and encryption objects illustrated in FIG. 4 are not intended to limit the scope of the present disclosure but are merely discussed to provide examples of the manner in which policies related to an application may be applied. Additional and/or different mappings between applications, application policies, cryptographic policies, and encryption objects may be identified and/or applied, in other embodiments. One of ordinary skill in the art would recognize many variations, modifications, and alternatives.

Figure 5:
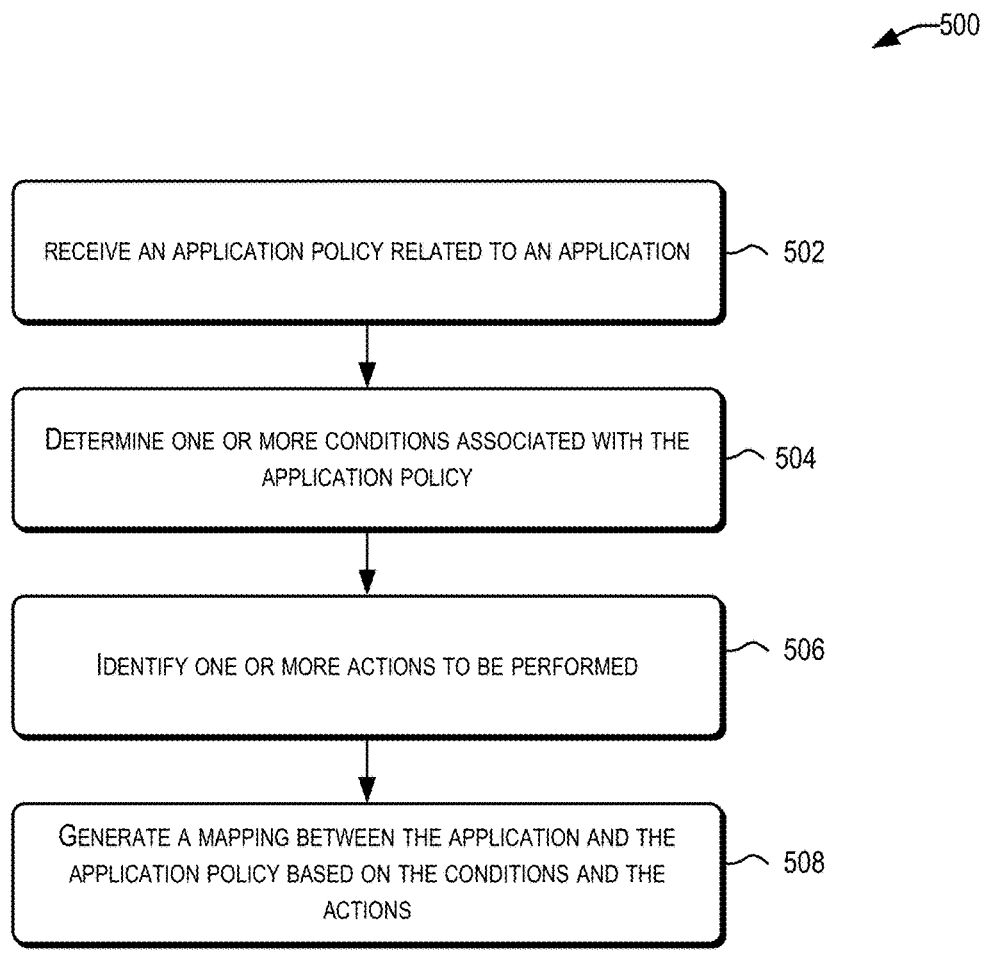
FIG. 5 illustrates an example flow diagram showing process 500 for performing the mapping of applications to application policies, in accordance with one embodiment of the present disclosure.
Figure 6:
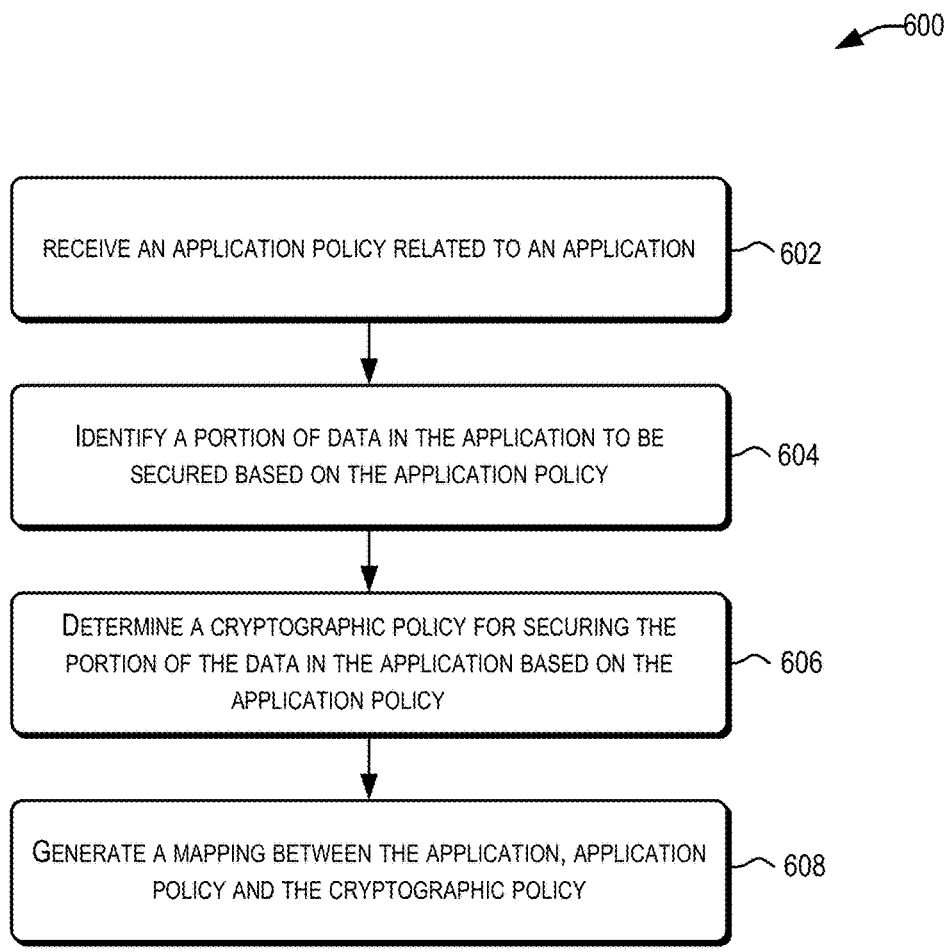
FIG. 6 illustrates an example flow diagram showing process 600 for performing the mapping of applications to application policies, and cryptographic policies, in accordance with one embodiment of the present disclosure.
Figure 7:
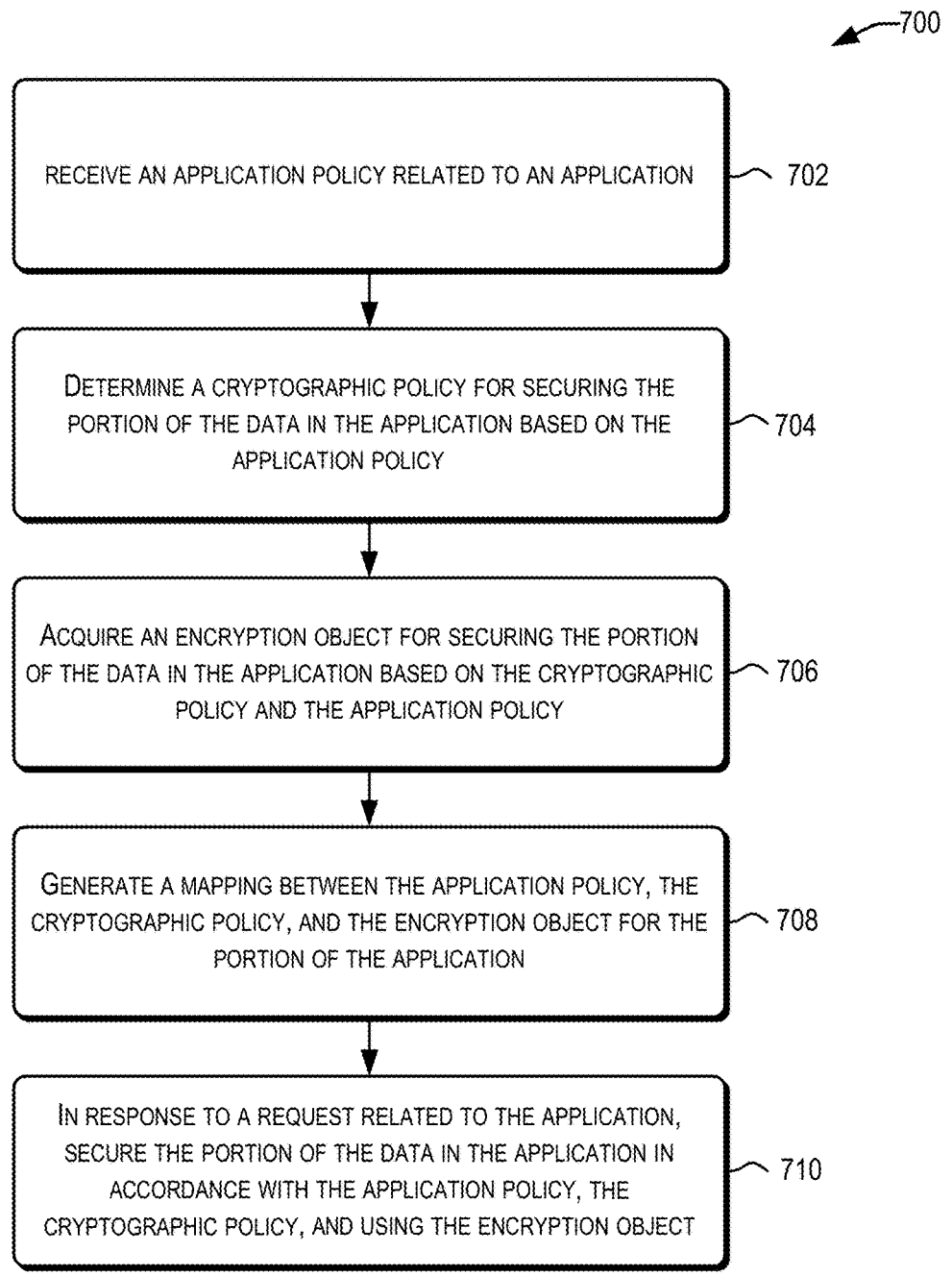
FIG. 7 illustrates an example flow diagram showing process 700 for performing the mapping of applications to application policies, cryptographic policies, and encryption objects, in accordance with one embodiment of the present disclosure.

FIGS. 5-7 illustrate example flow diagrams showing processes 500, 600, and 700 for managing data encryption for applications, in accordance with an embodiment of the present disclosure. The processes are illustrated as logical flow diagrams, each operation of which represents a sequence of operations that can be implemented in hardware, computer instructions, or a combination thereof In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 5 illustrates an example flow diagram showing process 500 for performing the mapping of applications to application policies, in accordance with one embodiment of the present disclosure. In some aspects, the process 500 of FIG. 5 may be performed by application policy engine 122 in service provider system 106 shown in FIG. 1. The process 500 may begin at 502 by receiving an application policy related to an application. As noted above, an application policy may be received when a user (e.g., a system administrator) of an application hosting system (e.g., 110(1)) transmits a request to application policy engine 122. At 504, the process 500 may include determining one or more conditions associated with the application policy. The conditions may specify, for instance, when an application policy is applicable for an application. At 506, the process 500 may include identifying one or more actions to be performed when one or more of the conditions are satisfied. For example, application policy engine 122 may determine that a user's access to an application is a condition that makes the application policy applicable to the application. Application policy engine 122 may then identify, based on the application policy, that the data in the application is to be encrypted using an encryption key of a particular strength when the condition is satisfied. In some embodiments, at 508, the process 500 may include generating a mapping between the application and the application policy based on the conditions and the actions.

In some embodiments, application policy engine 122 may identify at least a portion of the data in the application to be encrypted based on the conditions and actions associated with the application policy. For instance, application policy engine 122 may determine that a first condition is associated with an application policy for an application when a user accesses a first portion of the data in the application and that a second condition is associated with the application policy P3 when the user accesses a second portion of the data in the application that is different from the first portion. Application policy engine 122 may then identify, based on the application policy, a first action that is to be performed when the user accesses the first portion of the data in the application and a second action to be performed when the user accesses the second portion of the data in the application.

FIG. 6 illustrates an example flow diagram showing process 600 for performing the mapping of applications to application policies, and cryptographic policies, in accordance with one embodiment of the present disclosure. In some aspects, the process 600 of FIG. 6 may be performed by application policy engine 122 in service provider system 106 shown in FIG. 1. The process 600 may begin at 602 by receiving an application policy related to an application. At 604, the process 600 may include identifying a portion of the data in the application to be secured based at least in part on the application policy. In some embodiments the process at 604 may include determining one or more conditions associated with the application policy, identifying one or more actions to be performed when one or more of the conditions are satisfied and identifying at least a portion of the data in application to be secured based at least in part on the conditions and actions associated with the application policy. At 606, the process 600 may include determining a cryptographic policy for securing at least the portion of the data in the application based on the application policy. As noted above, a cryptographic policy may specify a type of cryptographic algorithm to be used to encrypt an application or a portion thereof, the type of encryption object (e.g., encryption keys and/or certificates) to be used to encrypt the data in the application, and the like.

In some embodiments, at 608, the process 600 may include generating a mapping between the application, application policy and the cryptographic policy. For instance, and as noted above, the mapping of an application to an application policy and a cryptographic policy may include determining by the application policy engine that a cryptographic policy based on a first hash function is to be applied to the data in the application when a first condition associated with the application policy for the application is satisfied and that a cryptographic policy based on a second hash function is to be applied to the data in the application when a second condition associated with the application policy for the application is satisfied.

FIG. 7 illustrates an example flow diagram showing process 700 for performing the mapping of applications to application policies, cryptographic policies, and encryption objects, in accordance with one embodiment of the present disclosure. In some aspects, the process 700 of FIG. 7 may be performed by application policy engine 122 and application policy handler 124 in service provider system 106 shown in FIG. 1. The process 700 may begin at 702 by receiving an application policy related to an application. At 704, the process 700 may include determining a cryptographic policy for securing at least a portion of the data in the application based on the application policy. At 706, the process 700 may include acquiring an encryption object (e.g., an encryption key and/or digital certificate) for securing at least the portion of the data in the application based on the cryptographic policy and the application policy.

At 708, the process 700 may include generating a mapping between the application policy, the cryptographic policy, and the encryption object for the portion of the data in the application. For instance, and as noted above, the mapping of an application to an application policy, a cryptographic policy, and an encryption object may include determining by the application policy engine that a cryptographic policy based on a first hash function that uses a 160-bit hash value is to be applied to the data in the application when a first condition is associated with the application policy for the application is satisfied and that a cryptographic policy based on a second hash function that uses a 224-bit hash value is to be applied to the data in the application when a second condition is associated with the application policy for the application is satisfied.

In some embodiments, at 710, the process may include receiving a request related to an application from a user of user device 102. The process at 710 may further include securing the portion of the data in the application in accordance with the application policy, the cryptographic policy, and using the encryption object, in response to the request.

In an embodiment, the process at 710 may be performed by application policy handler 124 in service provider system 106. For instance, application policy handler 124 may determine, at runtime, the appropriate security to be applied to the data in the application by obtaining information about the application policy, the cryptographic policy, and the encryption object to be applied to the application from application policy engine 122. Application policy handler 124 may then secure and/or encrypt the data in the application by applying the appropriate cryptographic policy and the encryption object in accordance with the application policy and transmit an encrypted version of the data in the application to the user. The user may then access and interact with the encrypted application on user device 102.

Data Encryption Service and Customized Encryption Management

According to certain embodiments of the present disclosure, the data encryption service described above may be included or implemented in a cloud computing environment that includes separate identity domains that are isolated from each other. Each identity domain may be viewed as a logical partition or a tenant of the cloud computing environment. In an embodiment, each such identity domain can be associated with a separate tenant, or customer, such as a different business organization. Thus, a first customer might be a first tenant of the cloud computing environment, a second customer, a second tenant of the cloud computing environment, a third customer, a third tenant of the cloud computing environment, and so on.

In certain embodiments, each logical partition of the cloud computing environment can be one of several logical partitions that are isolated from each other by identity domain management software that executes on the hardware within the computing environment. Each such domain can be viewed as a "slice" of the shared hardware and software resources within the computing environment that is associated with a potentially different customer (who may pay for the privilege of using that slice). Each identity domain can include user identities and instances of application software services sometimes separate executing instances of the same software code. The identity domain management software can enforce isolation between identity domains by preventing users from one such domain from accessing the service instances that are not associated with that domain, and by preventing service instances that are associated with one such domain from accessing user identities that are associated with that domain.

Figure 8:
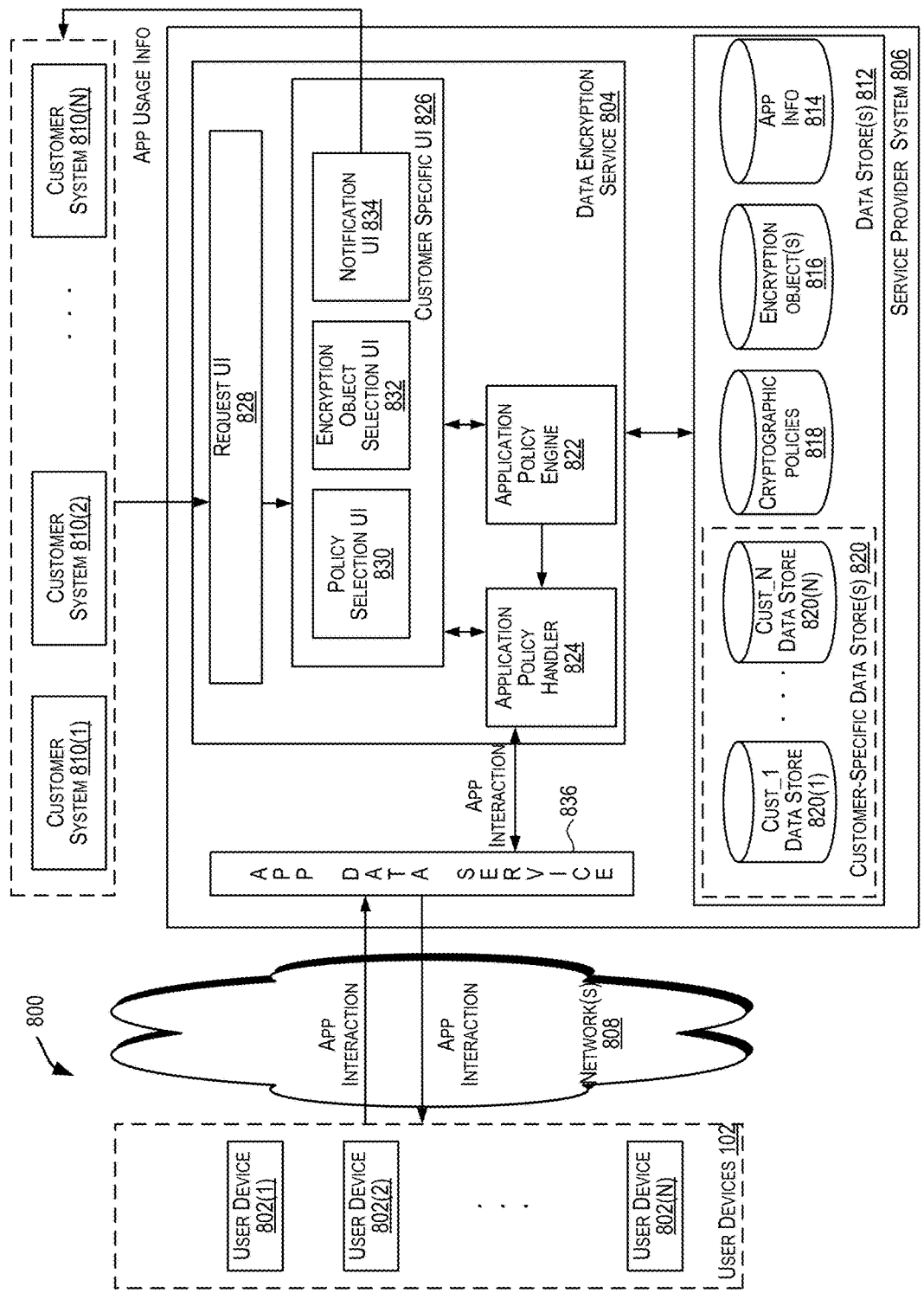
FIG. 8 illustrates a multi-tenant environment 800 in which a data encryption service 806 can be implemented, according to some embodiments.

FIG. 8 illustrates a multi-tenant environment 800 in which a data encryption service 806 can be implemented, according to some embodiments. As shown, multi-tenant environment 800 includes customer systems 810(1)-810(N) (collectively, customer systems 810). While not explicitly shown in FIG. 8, customer systems 810 may be communicatively coupled to a service provider system 806 via a communication network 808. Communication network 808 may be similar to or the same as communication network 108 described in FIG. 1. Service provider system 806 may be similar to or the same as service provider system 106 described in FIG. 1. In an embodiment, service provider system 806 may include a data encryption service 804 configured to provide data encryption services for applications hosted by, managed by, or stored in customer systems 810. These data encryption services may include, for instance, managing application policies, cryptographic policies, and encryption objects related to applications hosted by, managed by, or stored in customer systems 502. Data encryption service 804 may be the same as or similar to data encryption service 104 described in FIG. 1.

Customer systems 810 may represent external systems such as organizations or third party systems that provide, manage, or host a variety of resources such as software products, applications (e.g., cloud-based applications, enterprise applications, or any other applications), cloud services, various types of data (e.g., networked files, directory information, databases, or the like) and other resources. In some embodiments, a customer systems 810 may also represent application hosting systems, application providers, or cloud-service providers that host applications that may be managed by the organizations or third party systems. Although exemplary system environment 800 is shown with three customer systems, any number of customer systems may be supported, in other embodiments.

Customer systems 810 may be implemented or included in a computing system. Customer systems 810 may be implemented in hardware, firmware, software, or combinations thereof. Customer systems 810 may be implemented in a computing device, such as a PDA, a tablet computer, a laptop computer, a desktop computer, a wearable computer, a pager, etc. Customer systems 810 can be implemented using one or more memory storage devices and one or more processors. A memory storage device can be accessible to the processor(s) and can include instructions stored thereon which, when executed by the processor(s), cause the processor(s) to implement one or more operations disclosed herein.

In some examples, a customer system 810 may represent an organization comprising multiple subsystems in which each subsystem may represent various departments or business units within the organization. Each such subsystem may provide different services within the organization such as, for example, financial services, analytics services, business intelligence services, sales and marketing services, human resource services, and the like. Each of these services may in turn utilize, provide, manage and/or store different applications such as cloud-based applications, enterprise applications, cloud services, various types of data (e.g., networked files, directory information, databases, or the like), word processors, spreadsheets, accounting applications, web browsers, web applications, messaging services, native applications, or any other applications.

In certain situations, a user (e.g., a system administrator) of a customer system 810 may require to secure the data in applications provided by the different subsystems in accordance with the types of services provided by each subsystem. For instance, a system administrator may be required to secure the data in financial applications provided by a financial business unit of the customer system differently from the data in payroll applications provided by a human resource department of the customer system. In one embodiment of the present disclosure, data encryption service 804 may be configured to determine the appropriate encryption to be applied to the data in applications provided by various services (subsystems) of the customer system. For instance, data encryption service 804 can determine, for a customer system 810(1), the appropriate encryption to be applied to the data in an application by identifying the application policy, the cryptographic policy and the encryption objects (e.g., encryption keys and/or certificates) to be applied to the data in the application.

In certain embodiments, data encryption service 804 may provide various interfaces to enable a user of a customer system 810 to interact with data encryption service 804 to utilize the services provided by the data encryption service. In an example, the interfaces provided by data encryption service 804 may include a request User Interface (UI) 828 and a customer specific User Interface (826). A user (e.g., a system administrator) of a customer system 810 can interact with request UI 828 to request for data encryption services for applications managed by, hosted by, provided by, or stored in the customer system. For example, the user may interact with request UI 828 via a browser application executed by the customer system and the interaction may cause the browser application to generate a request to the data encryption service. In some examples, request UI 828 may include a log-in page (not shown in FIG. 8) that requests for log-in credentials from the user such as, but not limited to, a customer identity, a user name and a password.

Upon successful authentication of the user, in some examples, a user may specify, via request UI 828, an application to be secured by the data encryption service. For instance, the user may specify, via request UI 828, that the application to be secured is an expense report application of customer system 810. In some examples, the user may also specify additional information related to the application such as the application name, the application version, the application identifier, and the like via request UI 828.

Upon identifying and authenticating the user of the customer system (e.g., via request UI 828) as described above, data encryption service 804 may provide a customer specific UI 826 to the user of the customer system. Customer specific UI 826 may be configured to provide customer-specific information regarding application policies and encryption objects related to applications managed by the customer system to the user of the customer system. The customer-specific information may be obtained, for instance, by the data encryption service from information stored in data stores 810. In another example, data encryption service 804 may be configured to determine, at run time, the appropriate customer-specific information (comprising a set of one or more policies and a set of one or more encryption objects) to provide to the user of a customer system via customer specific UI 826 based on the information associated with the application received via request UI 828. For instance, data encryption service 804 may be configured to automatically determine a set of application policies and encryption objects that can be applied to an application based on the type of the application (e.g., expense report application) that is required to be secured. In other embodiments, data encryption service 804 may directly acquire the customer-specific information from one or more data stores of the customer system.

Figure 9:
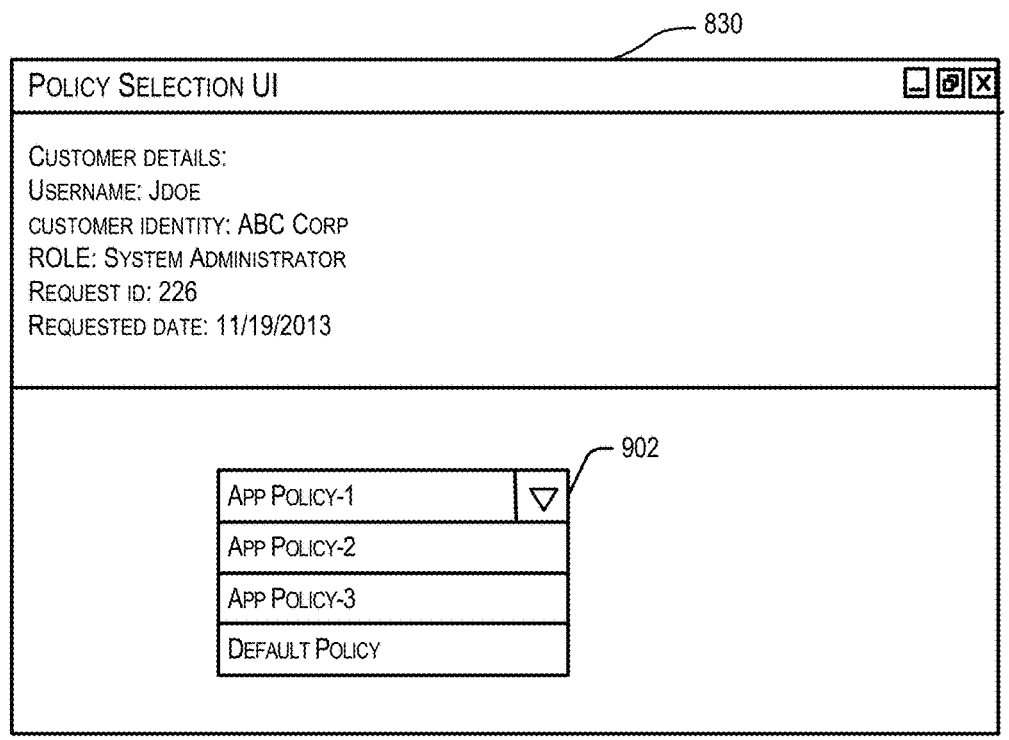
FIG. 9 is an exemplary illustration of a policy selection user interface (UI) provided by the data encryption service, in accordance with an embodiment of the present disclosure.

In an embodiment, a user of a customer system can utilize customer specific UI 826 to select the appropriate application policy and encryption object to be applied to an application. In some examples, customer specific UI 826 may include a policy selection User Interface (UI) 830, an encryption object selection UI 832, and a notification User Interface (UI) 834. Policy selection UI 830 may be configured to provide application policies related to applications hosted by the customer system. A user of customer system 810 may utilize policy selection UI 830 to select an application policy to be applied to an application. FIG. 9 is an exemplary illustration of the manner in which a user may interact with a policy selection UI to select an application policy for an application. As noted above, an application policy may specify information regarding the manner in which an application or portions of the application and/or data accessed by an application are to be secured. For example, an application policy may specify a set of conditions that indicate when an application policy for an application is applicable and a set of actions that are to be performed when one or more of the conditions are satisfied.

Figure 10:
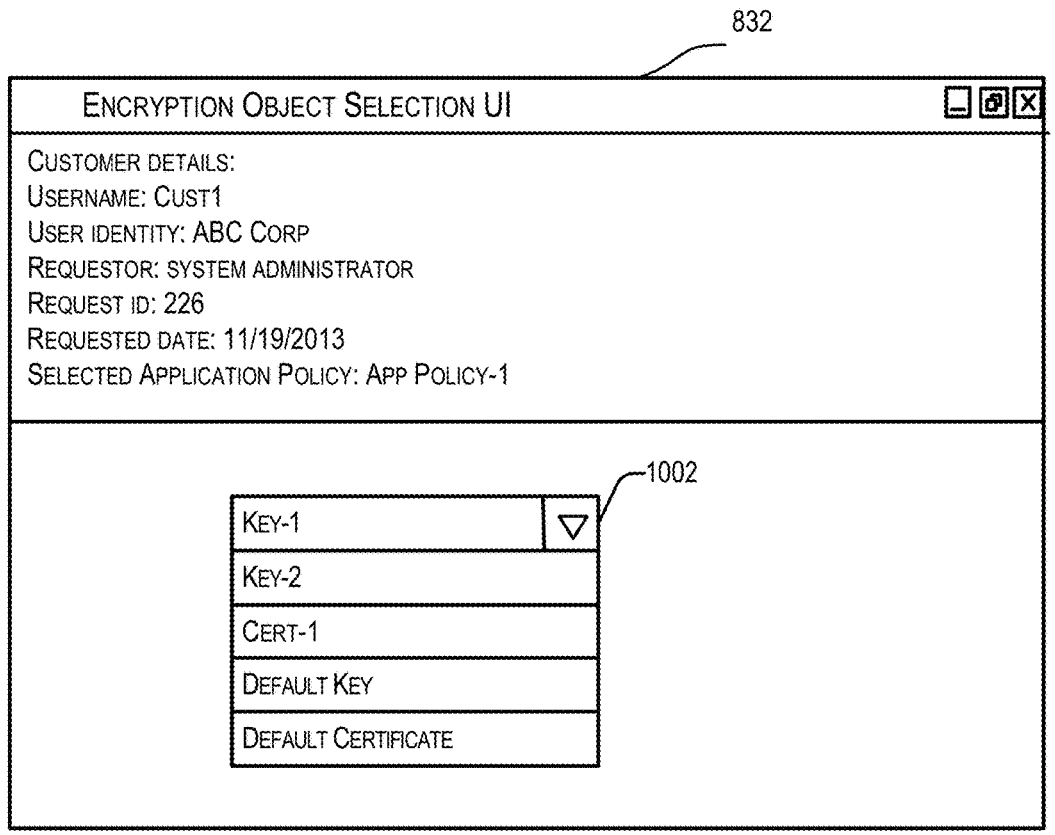
FIG. 10 is an exemplary illustration of an encryption object selection UI provided by the data encryption service, in accordance with an embodiment of the present disclosure.

Encryption object selection UI 832 may be configured to provide encryption objects that can be used to secure the data in an application in accordance with a selected application policy. For instance, in an embodiment, a user of a customer system 810 may select an appropriate encryption object (e.g., encryption key and/or certificate) to be applied to the data of an application based on the application policy selected via the policy selection UI 830 as described above. FIG. 10 is an exemplary illustration of the manner in which a user may interact with an encryption object selection UI to select an encryption object for an application.

Figure 11:
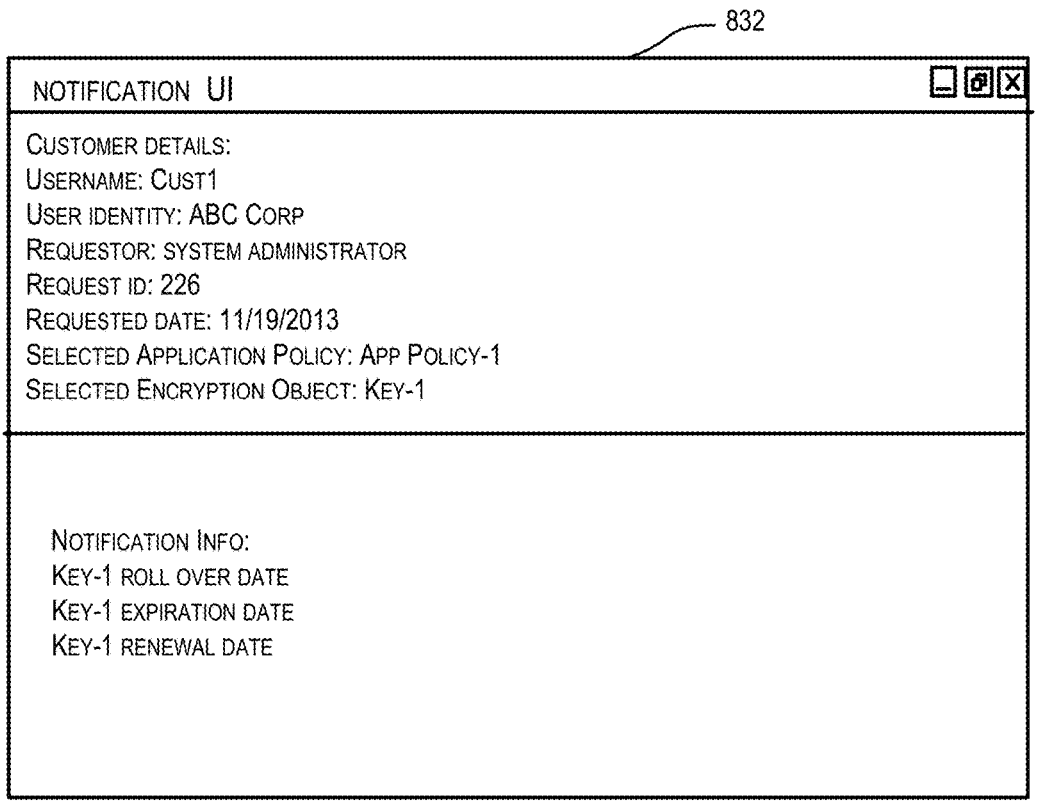
FIG. 11 is an exemplary illustration of a notification UI provided by the data encryption service, in accordance with an embodiment of the present disclosure.

In some embodiments, customer specific UI 826 may also include a notification UI 834. Notification UI 834 may be configured to provide notifications regarding applications managed by a customer system to a user of the customer system. These notifications may include for instance, the rollover date for an encryption object (e.g., key) used to secure an application, the expiration date of the encryption object, the renewal date of the encryption object, and so on. FIG. 11 is an exemplary illustration of a notification UI provided by the data encryption service.

The above discussion described an exemplary interaction by a user of a customer system 810 (e.g., 810(1)) with the various user interfaces 828, 830, 832, and 834 provided by the data encryption service. It is to be appreciated that, in other instances, when a user of a second and different customer system (e.g., 810(2)) interacts with the data encryption service to utilize the services provided by the data encryption service, the data encryption service may be configured to provide a different instance of the customer-specific UI (comprising a policy selection UI, an encryption object selection UI, and a notification UI) that relates to applications managed by the second customer system, to the user of the second customer system.

For instance, in some embodiments, customer systems 810 can correspond to different pharmaceutical manufactures (organizations) that execute each of their clinical trials through their slice of a clinical trials service that is responsible for handling clinical trials that the pharmaceutical manufacturer is conducting. Each manufacturer could have different encryption requirements and different data to be encrypted. For instance, the Health Insurance Portability and Accountability Act (HIPAA) may require that such data be HIPAA compliant (e.g., encrypted using at least an AES-256 or higher symmetric key algorithm).

Each manufacturer could have several drugs in clinical trials, with each drug being run through several hundred doctors. Each doctor in turn, could have several hundred patients participating in the clinical trial. In such a deployment, each doctor needs to be able to access and view trial information only for their patients. A doctor should not be able to view details of another doctor's patients or clinical trials for other drugs. Similarly, the manufacturer should only be able to view information about the results of the clinical trial but not individual patient details as that would be governed by government regulations as appropriate to the country where the trial is in effect.

In such an example, a doctor wishing to see the data of their patients should be granted access to the key encrypting information corresponding to those patients. Another doctor should not be granted access to that key. The manufacturer should not get access to keys that encrypt a patient's personal information. That is, an administrator or cloud vendor operating the clinical trials system should not have access to any of the above data and not have access to any of these keys.

In some examples, the customer systems that interact with the data encryption service may correspond to different customer systems. Such customer systems could include, for instance, infrastructure services like a Load Balancer system or a File storage system in parallel, storage services that have different application information in different formats, SaaS services (e.g., a CRM suite) or a benefits/compensation management service.

The disclosed data encryption service thus provides a centralized location for users of different customer systems to effectively manage the data encryption requirements of the various applications managed by the customer systems. For instance, by interacting with the various interfaces provided by customer specific UI 826, users of the customer systems can provide and/or select the appropriate customer-specific information related to application policies and encryption objects to be applied to applications managed by the customer systems. In an embodiment, the application policies and the encryption objects selected and/or provided by the users of the customer systems may be stored in one or more customer-specific data stores by the data encryption service. Additional details of the types of information stored in customer-specific data stores 820 is discussed in detail below.

In some embodiments, upon receiving the selection of an application policy and an encryption object related to an application from a user of a customer system as described above, data encryption service 804 may be configured to determine the appropriate encryption to be applied to the data in the application based on the application policy and the encryption object. For example, data encryption service 804 may be configured to first identify one or more conditions associated with the selected application policy. As noted above, the conditions associated with the application policy may specify when the application policy for the application is applicable. For instance, application policy engine 822 in data encryption service 804 may be configured to determine that a first condition is associated with the application policy for the application when a user accesses a first portion of the data in the application and that a second condition is associated with the application policy when the user accesses a second portion of the data in the application that is different from the first portion. Application policy engine 822 may then identify, based on the application policy, a first action that is to be performed when the user accesses the first portion of the data in the application and a second action to be performed when the user accesses the second portion of the data in the application. For instance, the actions may specify that the data in the application is to be encrypted using an encryption key of a particular strength depending on whether the user accesses the first portion or the second portion of the data in the application. In some embodiments, application policy engine 822 may be configured to create a mapping between the application and the application policy for the customer system and store the mapping in customer-specific data store 820.

Application policy engine 822 in data encryption service 804 may then be configured to determine a cryptographic policy to be applied to encrypt the data in the application in accordance with the application policy. For example, and as noted above, application policy engine 822 may be configured to identify, based on the application policy, that the first portion of the data in the application is to be encrypted using a first type of cryptographic policy and that the second portion of the data in the application is to be encrypted using a second type of cryptographic policy. In some embodiments, application policy engine 822 may be configured to interact with cryptographic policies data store 818 to retrieve the appropriate cryptographic policy to be applied to the data in the application or portions thereof, based on the application policy. Cryptographic policies data store 818 may be the same as or similar to cryptographic policies data store 118 described in FIG. 1. For instance, application policy engine 822 may be configured to determine, based on the application policy, that the portion of the data in the application that relates to compensation and benefits is to be encrypted using an encryption algorithm that uses a signing algorithm, whereas the portion of the data in the application that relates to sales data analytics is to be encrypted using an encryption algorithm that uses an asymmetric encryption algorithm. In some embodiments, application policy engine 822 may be configured to create a mapping between an application, its application policy and the cryptographic policy to be used to encrypt the data in the application and store the mapping in in the customer-specific data store 820.

In some embodiments, application policy engine 822 may be configured to determine the appropriate encryption object (e.g., encryption key and/or certificate) to be acquired for encrypting the data in the application or portions thereof, in accordance with the cryptographic policy and the application policy. For instance, application policy engine 822 may be configured to determine the appropriate encryption object to be applied to the data in the application based on the encryption object selected by a user (e.g., a system administrator) of customer system 810, via encryption object selection UI 832. Or, for example, application policy engine 822 may be configured to retrieve the appropriate encryption object from encryption objects data store 816. Encryption objects data store 816 may be the same as or similar to encryption objects data store 116 described in FIG. 1.

For instance, application policy engine 822 may be configured to determine, based on the cryptographic policy and the application policy for an application, that an encryption key of 128 bit strength is required to be used to encrypt the portion of the data in the application that relates to compensation and benefits whereas an RSA key of 1024 bit strength is required to be used to encrypt the portion of the data in the application that relates to sales data analytics. In some embodiments, application policy engine 822 may be configured to create a mapping between an application, its application policy, its cryptographic policy and the encryption object to be used to secure the data in the application and store the mapping in customer-specific data store 820.

In some embodiments, service provider system 806 may comprise one or more data stores 812. Data stores 812 may include an encryption objects data store 816, a cryptographic policies data store 818, an application information data store 814, and one or more customer-specific data stores 820. Encryption objects data store 816 may store a variety of encryption objects such as encryption keys and/or certificates that can be applied to secure the data in the applications hosted by, provided by, or stored in customer systems 810. Cryptographic policies data store 818 may store a variety of cryptographic policies related to the applications hosted by, provided by, or stored in customer systems 810. As noted above, cryptographic policies may specify, for instance, the types of cryptographic algorithms that can be applied to encrypt the data in an application or a portion thereof, the types of encryption objects (e.g., encryption keys and/or certificates) to be used to encrypt the data in the application, and so on. Encryption objects data store 816 and cryptographic policies data store 818 may be the same or similar to encryption objects data store 116 and cryptographic policies data store 118 described in FIG. 1. Application information data store 814 may be configured to store information related to applications hosted by, provided by, or stored in customer systems 810. This information may include, for instance, the application name, the application identifier, the application type (e.g., email application, word processing application, finance application, and the like). Application information data store 814 may be similar to or the same as application information data store 114 described in FIG. 1.

Figure 12:
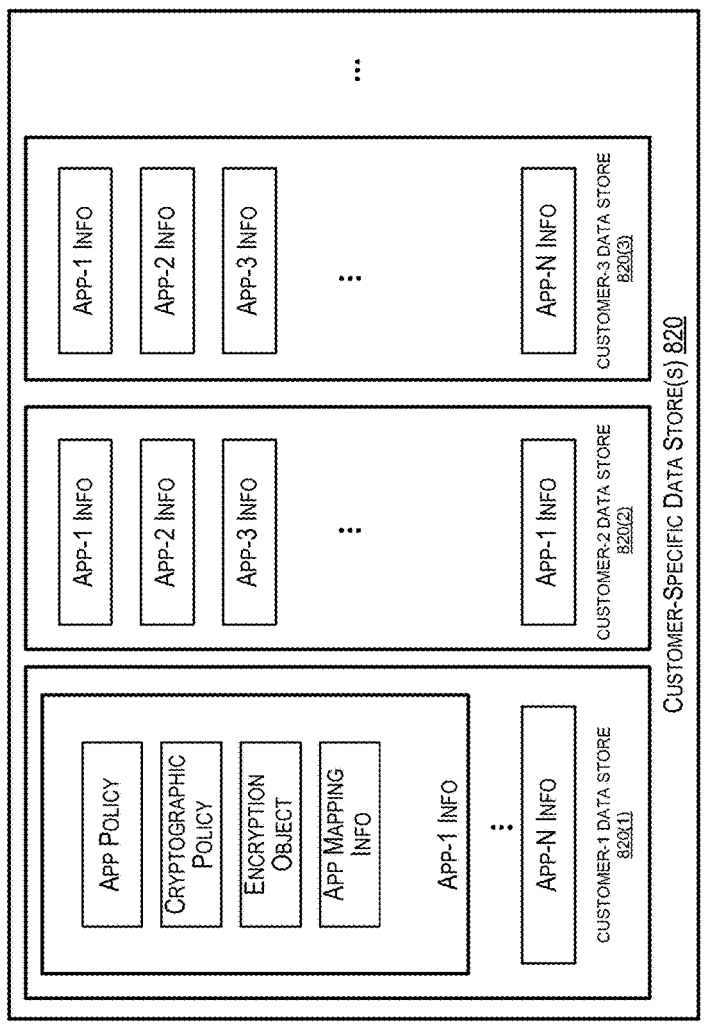
FIG. 12 is an exemplary illustration of the different types of customer-specific information that can be stored in a customer-specific data store by the data encryption service, in accordance with an embodiment of the present disclosure.

Customer-specific data stores 820 may be configured to store customer-specific information related to applications hosted by, accessed by or stored in customer systems 810. The customer-specific information may include, for example, application policies, cryptographic policies, and encryption objects related to applications hosted by, accessed by or stored in the customer systems. For instance, customer-specific data stores 820 may be configured to store customer-specific information associated with applications from a first customer system 810(1) in a first data store 820(1), customer-specific information associated with applications from a second customer system 810(2) in a second data store 820(2), customer-specific information associated with applications from a third customer system 810(3) in a third data store 820(3), and so on. The customer-specific data stores may be a part of data encryption service 804, in some embodiments, or may be stored in one or more data repositories accessible to the service provider system, in other embodiments. Although exemplary system environment 800 shows three customer-specific data stores, any number of data stores may be supported, in other embodiments. FIG. 12 is an exemplary illustration of the different types of customer-specific information that can be stored in a customer-specific data store, in accordance with an embodiment of the present disclosure.

Figure 13:
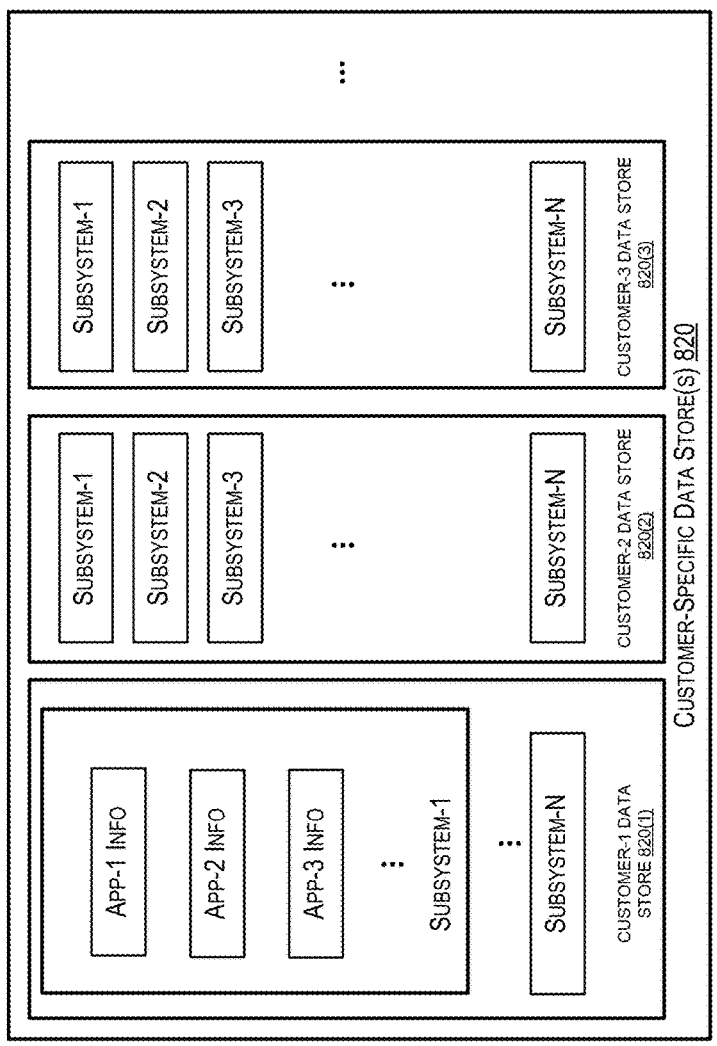
FIG. 13 is an exemplary illustration of the different types of customer-specific information related to applications from various subsystems of a customer system that can be stored in a customer-specific data store by the data encryption service, in accordance with an embodiment of the present disclosure.

In some aspects of the present disclosure, customer-specific data stores 820 may also be configured to store customer-specific data related to applications hosted by or accessed by different subsystems of customer systems 802. For instance, customer-specific data stores 820 may be configured to store customer-specific information associated with applications from a first subsystem, a second subsystem, a third subsystem, and so on of the first customer system 810(1) in a first data store 820(1). Similarly, customer-specific data stores 820 may be configured to store customer-specific data associated with applications from different subsystems of the second customer system 810(2) in a second data store 820(2) and customer-specific data associated with applications from different subsystems of the third customer system 810(3) in a third data store 820(3), and so on. FIG. 13 is an exemplary illustration of the different types of customer-specific information related to applications from various subsystems of a customer system that can be stored in a customer-specific data store, in accordance with an embodiment of the present disclosure.

Application policy handler 824 be configured to perform the encryption of an application at runtime based, for example, on a request received from a user of user device 802. For instance, application policy handler 824 may determine, at runtime, the appropriate encryption to be applied to the data in the application by interacting with application policy engine 822 to determine the appropriate application policy, the cryptographic policy, and the encryption objects to be applied to the application. Application policy handler 824 may perform the encryption of the data in the application, at run time, based on the application policy, the cryptographic policy, and the encryption object and transmit an encrypted version of the data in the application to the user on user device 820 via application data service 836. Application data service 836 may be the same or similar to application data service 126 discussed in relation to FIG. 1.

FIG. 9 is an exemplary illustration of a policy selection user interface (UI) provided by the data encryption service, in accordance with an embodiment of the present disclosure. In an embodiment, a user (e.g., a system administrator) of a customer system 810 can interact with policy selection UI 830 to select a policy to be applied to an application to be secured by the data encryption service. In some examples, policy selection UI 830 may display information related to the request that was received by data encryption service 804 via request UI 828. This information may include, for example, a username of the user of the customer system who made the request, an identity of the customer system, a role of the user who made request, a request identifier and a date that the request was made. Policy selection UI 830 may also include a drop down menu 902 comprising various types of application policies that may be applied to an application. The user may select a particular policy to be applied to an application by selecting a policy from drop down menu 902. In some examples, the user may also select a default policy to apply to the application via policy selection UI 830.

FIG. 10 is an exemplary illustration of an encryption object selection UI provided by the data encryption service, in accordance with an embodiment of the present disclosure. In an embodiment, a user (e.g., a system administrator) of a customer system 810 can interact with encryption object selection UI 832 to select a particular type of encryption object to be applied to the data in an application hosted by, provided by, or accessed by the customer system via a browser application executed by the customer system. In some examples, encryption object selection UI 832 may display information related to a request that was received by the data encryption service 804 via request UI 828. As noted above, this information may include, for example, the username of the user of the customer system who made the request, the identity of the customer system, the role of the user who made request, a request identifier and the date that the request was made. In some examples, the information may also include an application policy selected by the user via policy selection UI 830. Encryption object selection UI 832 may include a drop down menu 1002 comprising various types of encryption objects such as encryption keys and/or certificates that may be applied to the data in an application by the user. The user may select a particular encryption object to be applied to the data in an application by selecting an encryption object from drop down menu 1002.

FIG. 11 is an exemplary illustration of a notification UI provided by the data encryption service, in accordance with an embodiment of the present disclosure. In an embodiment, a user (e.g., a system administrator) of a customer system 810 can interact with notification UI 832 to receive notifications related to applications managed by the customer system 810 from the data encryption service. Such notifications may include, for instance, the rollover date for an encryption object (e.g., key) used to secure an application, the expiration date of the encryption object, the renewal date of the encryption object, and so on.

Such notifications may include notifications for a mismatch in policy. For example, a cryptography policy declared by the administrator of the customer system might require a certain algorithm, key strength, encryption mode. If this is not supported by the customer system, the administrator may be notified to change the policy. In some examples, an administrator in the customer's identity domain may want their IT department to control how soon before expiry of an encryption object that they would like to be notified. This "period before expiry" may vary from one customer to another. In addition, in some embodiments, certain encryption keys could be created in the customer system with a fixed lease or validity. When the key is close to its expiry time or its lease is about to get over, the administrator of the customer system may be interested in knowing this in advance, so that any of the application operations like encryption and the like that rely on the key are not impacted. This can help the administrator plan ahead and rollover the key or provision another key.

FIG. 12 is an exemplary illustration of the different types of customer-specific information that can be stored in a customer-specific data store by the data encryption service, in accordance with an embodiment of the present disclosure. In an embodiment, the customer-specific information may include, for a plurality of applications managed by a customer system, the application policies, cryptographic policies, and encryption objects related to the applications. In some embodiments, the customer-specific information may also include application mapping information. The application mapping information may include, for instance, information that maps an application to its application policy, cryptographic policy, and encryption object. As noted above, customer-specific data stores 820 may be configured to store customer-specific information associated with applications from a first customer system 810(1) in a first data store 820(1), customer-specific information associated with applications from a second customer system 810(2) in a second data store 820(2), customer-specific information associated with applications from a third customer system 810(3) in a third data store 820(3), and so on.

FIG. 13 is an exemplary illustration of the different types of customer-specific information related to applications from various subsystems of a customer system that can be stored in a customer-specific data store by the data encryption service, in accordance with an embodiment of the present disclosure. As noted above, the customer-specific information may include, for example, application policies, cryptographic policies, and encryption objects related to applications hosted by, accessed by or stored in the customer system. In some embodiments, the customer-specific information may include application mapping information. The application mapping information may include, for instance, information that associates the applications to application policies, cryptographic policies, and encryption objects. In the embodiment depicted in FIG. 13, customer-specific data stores 820 may be configured to store customer-specific information associated with applications from various subsystems of a first customer system 810(1) in a first data store 820(1), customer-specific information associated with applications from various subsystems of a second customer system 810(2) in a second data store 820(2), customer-specific information associated with applications from various subsystems of a third customer system 810(3) in a third data store 820(3), and so on.

Figure 14:
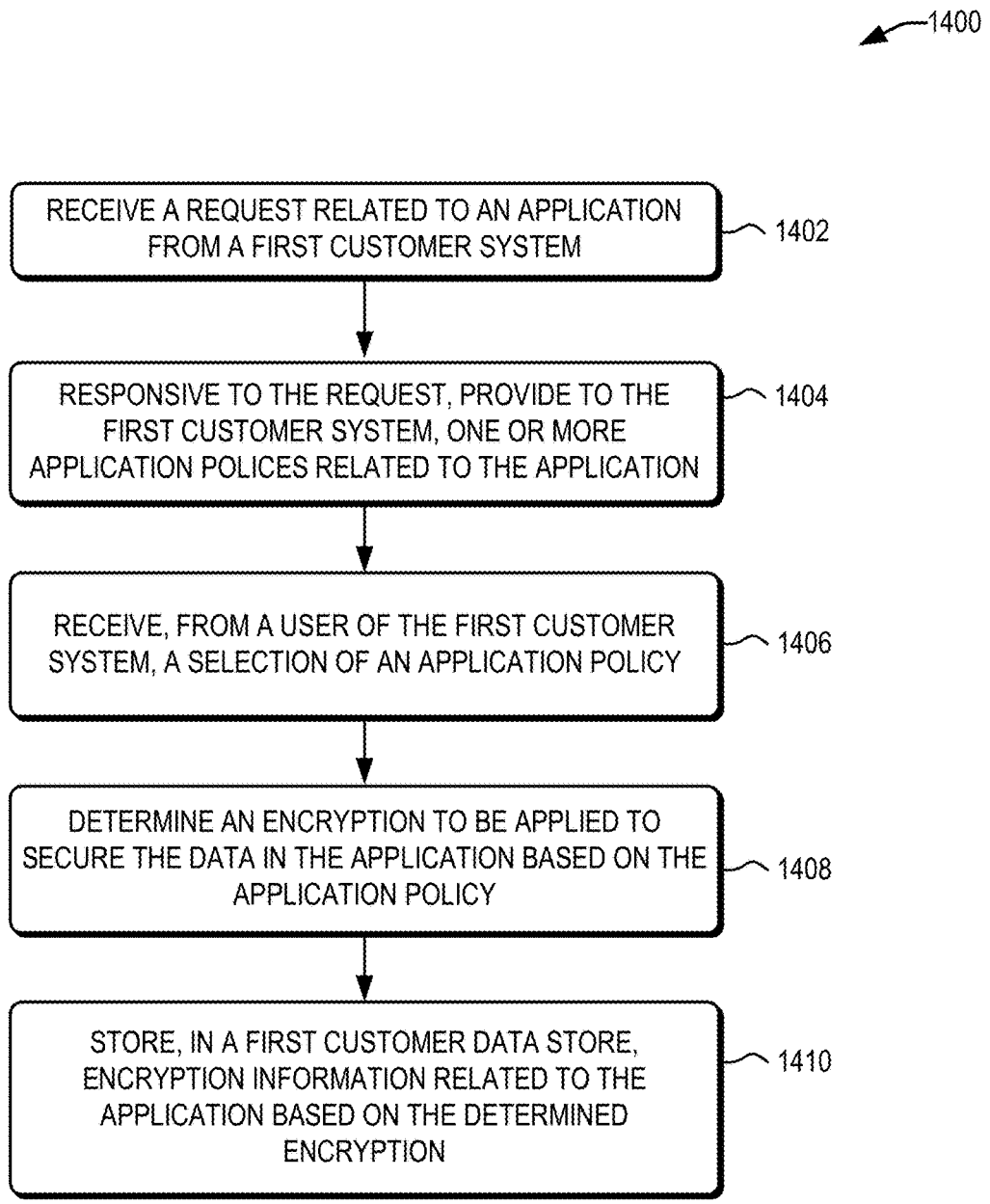
FIG. 14 illustrates an example flow diagram showing process 1400 for performing customized data encryption for an application by the data encryption service, in accordance with one embodiment of the present disclosure.
Figure 15:
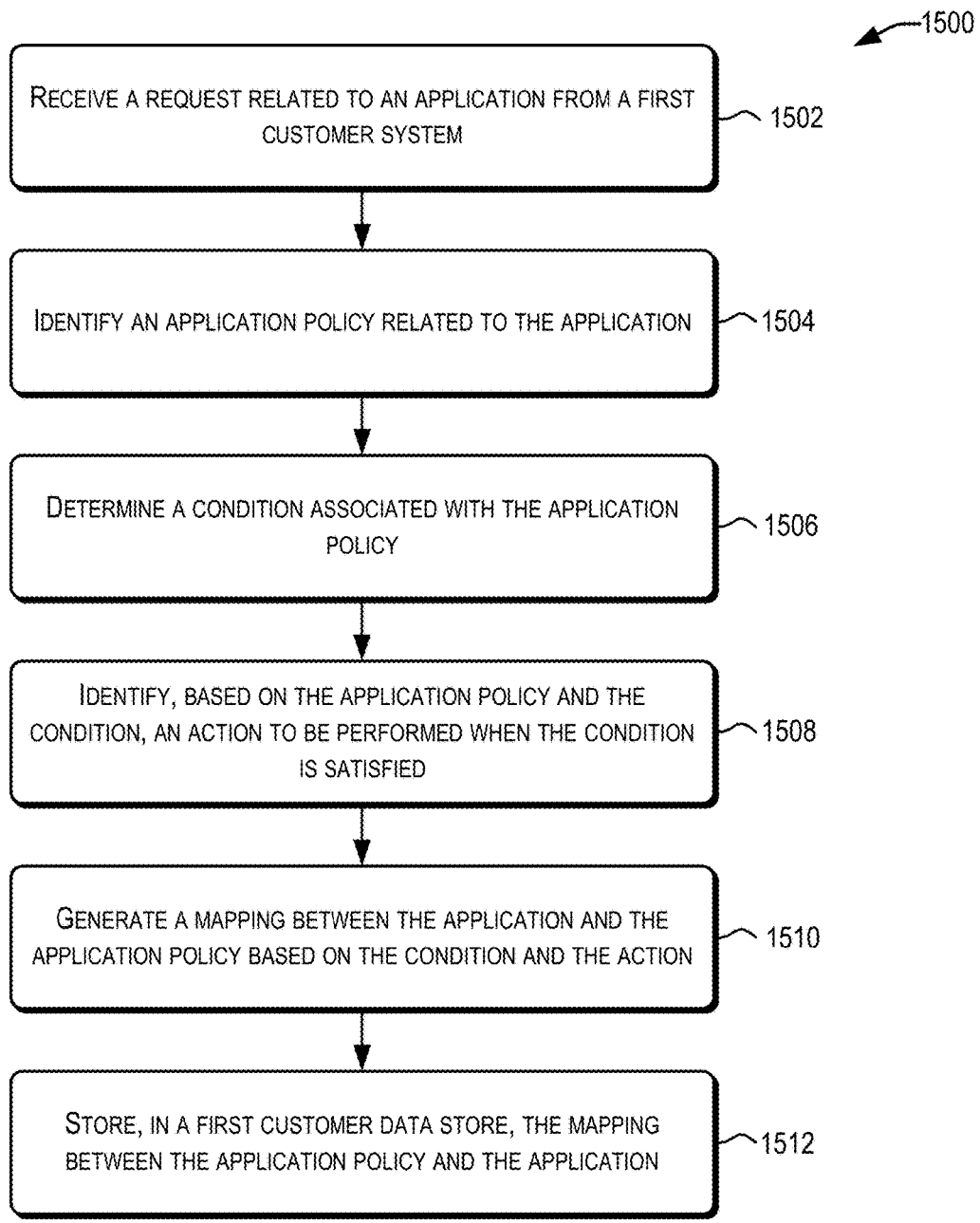
FIG. 15 illustrates an example flow diagram showing process 1500 for performing customized data encryption for an application by the data encryption service, in accordance with another embodiment of the present disclosure.
Figure 16:
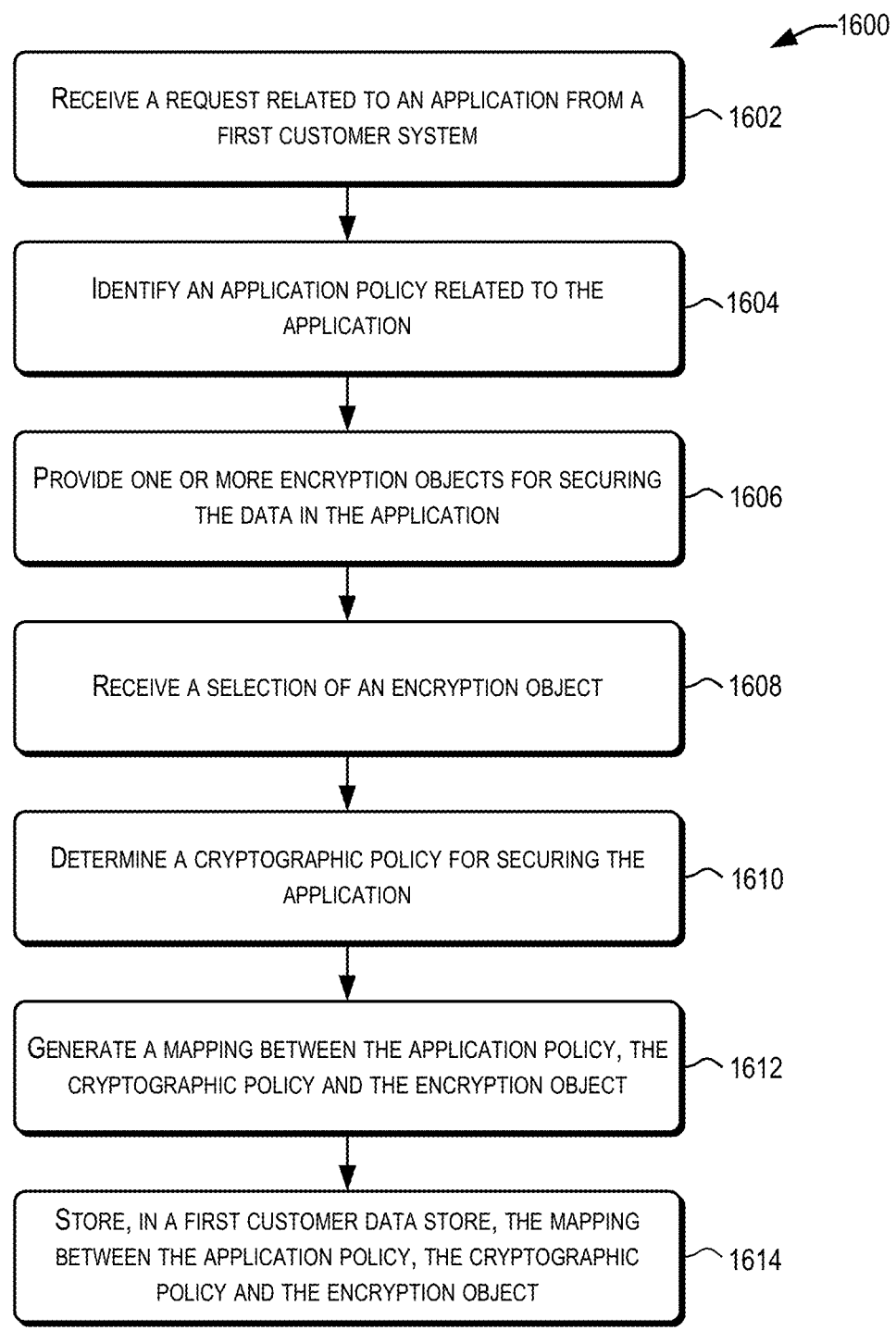
FIG. 16 illustrates an example flow diagram showing process 1600 for performing customized data encryption for an application by the data encryption service, in accordance with another embodiment of the present disclosure.

FIGS. 14-16 illustrate example flow diagrams showing processes 1400, 1500, and 1600 for performing customized data encryption, in accordance with an embodiment of the present disclosure. The processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 14 illustrates an example flow diagram showing process 1400 for performing customized data encryption for an application by the data encryption service, in accordance with one embodiment of the present disclosure. In some aspects, the process 1400 of FIG. 14 may be performed by modules 826, 828, 830, 832 and 834 of data encryption service 804 shown in FIG. 8. The process 1400 may begin at 1402 when a request related to an application is received from a first customer system. For instance, a user of a first customer system may submit via request UI 828, a request to the data encryption service to secure an application managed by the first customer system. Responsive to the request, at 1404, the process 1400 may include providing to the first customer system, one or more application policies related to the application. As noted above, in an embodiment, the data encryption service may provide the application policies related to the application via policy selection UI 830.

In some embodiments, at 1406, the process 1400 may include receiving from the user, a selection of an application policy. For instance, a user may interact with policy selection UI 830 to determine the appropriate application policy to be applied to the application. At 1408, the process 1400 may include determining the encryption to be applied to secure the data in the application based on the application policy. For instance, application policy engine 822 may determine the encryption to be applied to the data in the application by determining the appropriate cryptographic policy and encryption object (e.g., encryption key and/or certificate) to be applied to the application based on the selected application policy. For example, information related to the cryptographic policy and the encryption object (e.g., encryption key and/or certificate) may be obtained from data stores 812. In some examples, at 1408, the process 1400 may include storing, in a first customer data store, encryption information related to the application. The encryption information may include, for instance, the application policy, cryptographic policy and the encryption object associated with the application.

FIG. 15 illustrates an example flow diagram showing process 1500 for performing customized data encryption for an application by the data encryption service, in accordance with another embodiment of the present disclosure. In some aspects, the process 1500 of FIG. 15 may be performed by modules 826, 828, 830, 832 and 834 of data encryption service 804 shown in FIG. 8. The process 1500 may begin at 1502 when a request related to an application is received from a first customer system. For instance, the request may be a request from a user of the first customer to secure an application. At 1504, the process may include identifying an application policy related to the application. The application policy may be identified, in an embodiment, by providing, to the user of the first customer system, a plurality of application policies related to the application via a policy selection UI 830 and receiving a selection of an application policy from the user. At 1506, the process 1500 may include determining a condition associated with the application policy that specifies when an application policy for an application is applicable. At 1508, the process 1500 may include identifying, based on the application policy and the condition, an action to be performed when the condition is satisfied.

For instance, the processes at 1506 and 1508 may determine that an application policy P1 for an application A1 is applicable when a user accesses the application A1. Thus, processes 1506 and 1508 may determine that the user's access to the application A1 is a condition (C1) that makes the application policy P1 applicable to application A1. Processes 1506 and 1508 may then identify, based on the application policy P1, that the data in the application is to be encrypted using an encryption key of a particular strength when the condition C1 is satisfied. Thus, processes 1506 and 1508 may determine that the 'action' to be performed is the encryption of the data in the application using an encryption key of a particular strength when the user accesses the application.

In some embodiments, at 1510, the process 1500 includes generating a mapping between the application and the application policy based on the condition and the action. At 1512, the process 1500 may include storing, in a first customer system, a mapping between the application policy and the application.

FIG. 16 illustrates an example flow diagram showing process 1600 for performing customized data encryption for an application by the data encryption service, in accordance with another embodiment of the present disclosure. In some aspects, the process 1600 of FIG. 16 may be performed by modules 826, 828, 830, 832 and 834 of data encryption service 804 shown in FIG. 8. The process 1600 may begin at 1602 when a request related to an application is received from a first customer system. For instance, the request may be a request from a user of the first customer to secure an application. At 1604, the process 1600 may include identifying an application policy related to the application. The application policy may be identified, in an embodiment, by providing, to the user of the first customer system, a plurality of application policies related to the application via a policy selection UI 830 and receiving a selection of an application policy from the user. In some embodiments, at 1606, the process may include providing one or more encryption objects for securing the data in the application. The encryption objects may, in an example, be provided to a user of the first customer system via an encryption object selection UI 832. At 1608, the process 1600 may include receiving a selection of an encryption object from the user via the encryption object selection UI.

In some embodiments, at 1610, the process 1600 may include determining an appropriate cryptographic policy to be applied for securing the data in the application based on the identified application policy and the selected encryption object. At 1612, the process 1600 may include generating a mapping between the application policy, the cryptographic policy and the encryption object. In some embodiments, at 1614, the process 1600 may include storing, in a first customer data store, the mapping between the application policy, the cryptographic policy and the encryption object.

Monitoring and Alert Services and Data Encryption Management

In accordance with certain embodiments of the present disclosure, the disclosed data encryption service may be configured to provide monitoring and alert services related to encryption objects (e.g., encryption keys and certificates) managed by the data encryption service. The monitoring and alert services may include transmitting alerts related to the encryption objects via various communication channels when one or more conditions related to the encryption objects are satisfied. The disclosed alert and monitoring service may be utilized by application providers, application hosting systems, cloud service providers, customer systems or third party (external) systems that host, manage, provide, and/or store applications. As noted above, applications may include, without limitation, cloud-based applications, enterprise applications, cloud services, various types of data (e.g., networked files, directory information, databases, or the like), word processors, spreadsheets, accounting applications, web browsers, web applications, messaging services, native applications, or any other applications.

As further noted above, these applications may utilize different encryption objects (e.g., encryption keys and certificates) to secure their information. Managing the encryption objects across different applications can be challenging because oftentimes these encryption objects have to be periodically renewed and/or updated in accordance with different schedules, application policies, and encryption key policies applicable to each application. If the encryption objects are not renewed and/or updated appropriately, the encryption objects may no longer function correctly and/or may lead to security warnings that the encryption objects are out of compliance. For instance, different types of encryption objects may be associated with different renewal procedures. For example, encryption objects such as digital certificates can include those used in hostile zones (e.g., externally) signed by a third party certificate authority, or those used internally signed by an internal issuing authority. Embodiments of the present disclosure address these challenges by providing a monitoring and alert service that can be configured to monitor the lifecycle of the encryption objects by transmitting alerts related to the encryption objects via various communication channels, to the users of the data encryption service. Additional details of the operations performed by the disclosed alert and monitoring service are described in detail below.

Figure 17:
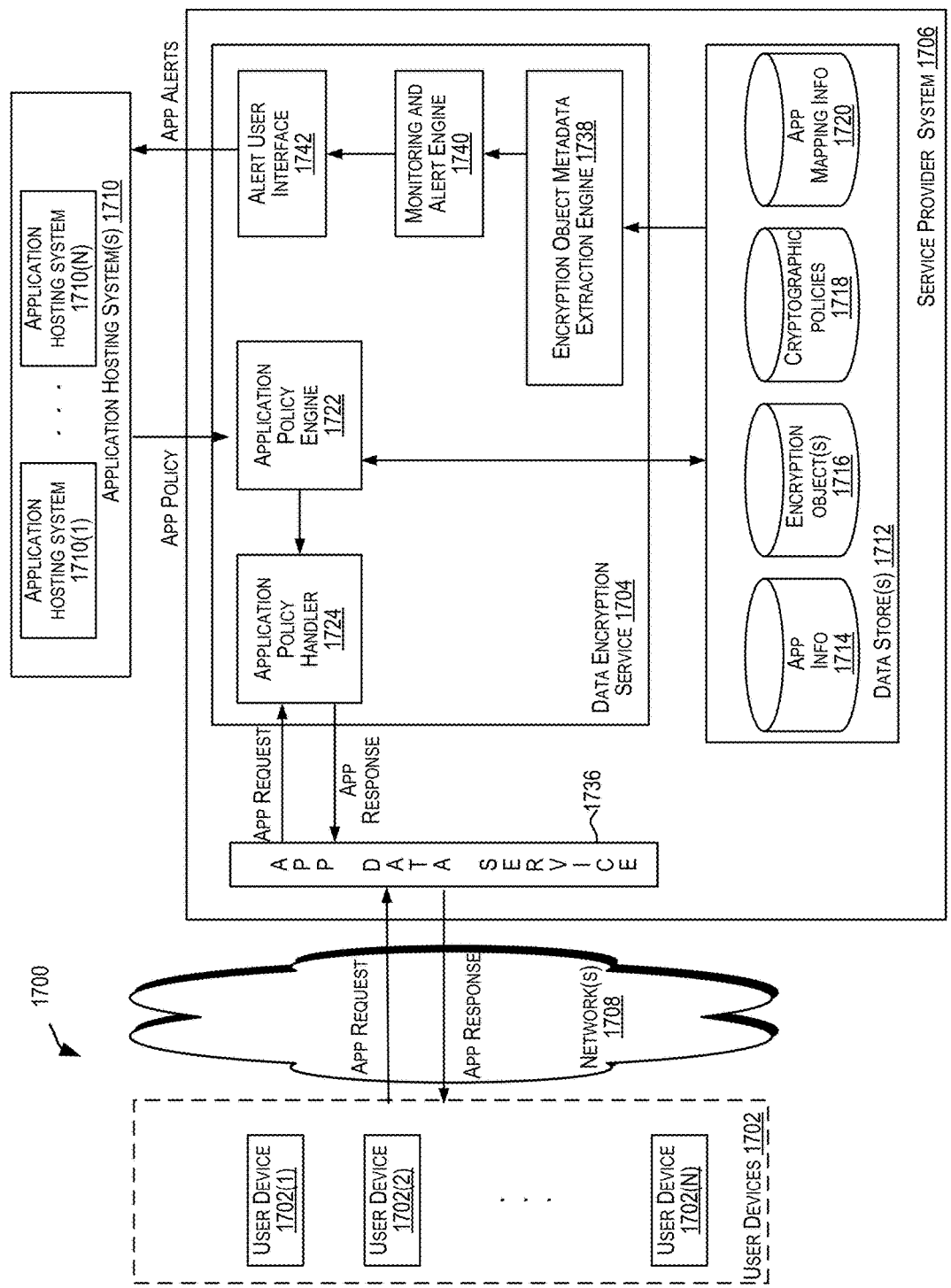
FIG. 17 illustrates an environment 1700 of a monitoring and alert service provided by a data encryption service, in accordance with an embodiment of the present disclosure.

FIG. 17 illustrates an environment 1700 of a monitoring and alert service provided by a data encryption service, in accordance with an embodiment of the present disclosure. As shown, environment 1700 includes application hosting systems 1710(1)-1710(N) (collectively, application hosting systems 1710). While not explicitly shown in FIG. 17, application hosting systems 1710 may be communicatively coupled to a service provider system 1706 via a communication network 1708. Communication network 1708 may be similar to or the same as communication network 108 or 808 described in FIGS. 1 and 8, respectively. Service provider system 1706 may be similar to or the same as service provider system 106 or 806 described in FIGS. 1 and 8, respectively.

As described in relation to FIG. 1, application hosting systems 1710 may represent external systems such as organizations, third party systems, or cloud-service providers that provide, manage, or host a variety of resources such as software products, applications (e.g., cloud-based applications, enterprise applications, or any other applications), cloud services, various types of data (e.g., networked files, directory information, databases, or the like) and other resources. Application hosting systems 1710 may be implemented or included in a computing system. Application hosting systems 1710 may be implemented in hardware, firmware, software, or combinations thereof. Application hosting systems 1710 may be implemented in a computing device, such as a PDA, a tablet computer, a laptop computer, a desktop computer, a wearable computer, a pager, etc. Application hosting systems 1710 can be implemented using one or more memory storage devices and one or more processors. A memory storage device can be accessible to the processor(s) and can include instructions stored thereon which, when executed by the processor(s), cause the processor(s) to implement one or more operations disclosed herein.

In an embodiment, service provider system 1706 may include a data encryption service 1704 and one or more data stores 1712. Data encryption service 1704 may be configured to provide data encryption services for users of the service provider system. These users may include, for instance, users (e.g., system administrators) of application hosting systems 1710. The users may also include users of user devices 1702 that utilize applications hosted by the application hosting systems. As noted above, these data encryption services may include, for instance, managing application policies, cryptographic policies, and encryption objects related to applications hosted by, managed by, or stored in application hosting systems 1710. Data encryption service 1704 may be the same as or similar to data encryption service 104 or 804 described in FIGS. 1 and 8, respectively. Data stores 1712 may be the same as or similar to data stores 112 described in relation to FIG. 1. In an embodiment, data stores 1712 may include an application information data store 1714, an encryption object data store 1716, a cryptographic policies data store 1718, and an application mapping information data store 1720.

In an embodiment, data encryption service 1704 may include an application policy engine 1722 and an application policy handler 1724. Application policy engine 1722 may be configured to receive an application policy for an application from application hosting systems 1710 and identify portions of the data in the application that have to be secured based on the application policy. For instance, application policy engine 1722 may be configured to identify, based on the application policy, that a first portion of the data in the application comprises information related to compensation and benefits and that a second portion of the data in the application comprises information related to sales data analytics.

Application policy engine 1722 may then be configured to determine a cryptographic policy for securing the data in the application or identified portions of the data in the application, based on the application policy. For instance, application policy engine 1722 may be configured to interact with cryptographic policies data store 1718 to retrieve the appropriate cryptographic policy to apply to the application or portions thereof, based on the application policy. For instance, continuing with the example of a financial application discussed above, application policy engine 1722 may be configured to determine, based on the application policy, that a portion of the data in the application that relates to compensation and benefits has to be encrypted using an encryption algorithm that uses a signing algorithm, whereas a portion of the data in the application that relates to sales data analytics has to be encrypted using an encryption algorithm that uses an asymmetric encryption algorithm.

In some embodiments, application policy engine 1722 may be configured to determine the appropriate encryption objects (e.g., encryption keys and/or certificates) to be acquired for encrypting the data in the application or portions thereof, in accordance with the cryptographic policy and the application policy. For instance, application policy engine 1722 may be configured to determine, based on the cryptographic policy and the application policy, that an encryption key, $E_K$, of 128 bit strength is required to be used to encrypt the portion of the data in the application that relates to compensation and benefits whereas an RSA key, $E_K$, of 1024 bit strength is required to be used to encrypt the portion of the data in the application that relates to sales data analytics. Application policy engine 1722 may then be configured to acquire the appropriate encryption key for securing the data in the application or portions thereof. For instance, application policy engine 1722 may transmit a request to encryption objects data store 1716 to retrieve the appropriate encryption key from encryption objects data store 1716. If application policy engine 1722 determines that the encryption object (e.g., encryption key and/or certificate) is not available in encryption objects data store 1716, then in some embodiments, application policy engine 1722 may be configured to generate the appropriate encryption object to be used to secure the data in the application or portions thereof and store the generated encryption object in the encryption objects data store. In some embodiments, the encryption objects may be stored in application hosting systems 1710 and application policy engine 1722 may also be configured to acquire the relevant encryption objects to encrypt the data in the application from the application hosting systems 1710.

In certain embodiments, application policy engine 1722 may be configured to create a mapping between an application, its application policy, its cryptographic policy and the encryption object (e.g., encryption keys and/or certificates) to be used to secure the data in the application. An example of a mapping of an application to its application policy, cryptographic policy, and encryption object is described in relation to FIG. 4. In an embodiment, the mapping of information between applications, application policies, cryptographic policies and encryption objects is stored in application mapping information data store 1720.

Application policy handler 1724 may be configured to perform the encryption of the data in an application at runtime based, for example, on a request received from a user of user device 1702. For instance, application policy handler 1724 may determine, at runtime, the appropriate encryption to be applied to the data in the application by interacting with application policy engine 1722 to determine the appropriate application policy, the cryptographic policy, and the encryption objects to be applied to the data in the application. Application policy handler 1724 may then perform the encryption of the data in the application, at run time, based on the application policy, the cryptographic policy, and the encryption object and transmit an encrypted version of the application to the user on user device 1702 via application data service 1736. Application data service 1736 may be the same or similar to application data service 126 described in relation to FIG. 1.

In accordance with certain embodiments of the present disclosure, data encryption service 1704 may be configured to provide alert and monitoring services related to encryption objects to the users of the data encryption service. The alert and monitoring service may be configured to provide alerts related to the encryption objects when one or more conditions related to the encryption objects are satisfied and transmit the alerts to the users of the data encryption service via one or more communication channels. For instance, the alert and monitoring service can be configured to monitor the lifecycle of encryption objects (e.g., encryption keys and/or certificates) for applications hosted by application hosting systems.

In some embodiments, the alert and monitoring service may be configured to trigger alerts based on the expiration dates of the encryption objects. For example, the alert and monitoring service may be configured to define a reminder event at predetermined time intervals relative to an expiration date, a renewal date, or a rollover date associated with an encryption object. In some embodiments, in response to detecting an alert event, the alert and monitoring service can be configured to transmit the alert over various communication channels as specified by the application policy. Communication channels can include, without limitation, email, Instant Messaging (IM), Short Message Service (SMS), Multimedia Message Service (MMS) Application-to-Application messaging, and the like.

In some embodiments, in addition to monitoring the lifecycle of encryption objects, the alert and monitoring service may also be configured to perform the periodic maintenance of the encryption objects. For example, encryption keys are periodically rolled over (e.g., per corporate or governance policies). Key rollover includes not just updating keys, but also decrypting data that uses those keys and then encrypting the data using the updated key. As such, the process of key rollover may be time consuming. By providing periodic alerts, the disclosed alert and monitoring service can allocate sufficient time to administrators to rollover keys without interrupting service.

In an embodiment, the alert and monitoring service may be provided by one or more modules of data encryption service 1704. These modules may include an encryption object metadata extraction engine 1738, a monitoring and alert engine 1740, and an alert User Interface (UI) 1742. These modules may include or be provided using one or more computers and/or servers which may be general purpose computers, specialized server computers, server farms, server clusters, or any other appropriate arrangement and/or combination. The various modules of the data encryption service are meant for illustrative purposes only and are not intended to limit the scope of embodiments of the present disclosure. Alternative embodiments may include more or fewer modules than those shown in FIG. 17.

Encryption object metadata extraction engine 1738 may be configured to identify one or more encryption objects (e.g., encryption keys and/or certificates) associated with an application and extract metadata information from the encryption objects. In some examples, metadata information may represent non-secure information related to the encryption objects. The metadata information for an encryption object can include various information related to the encryption object such as, for example, information related to attributes of the encryption object. For example, an encryption object may have multiple associated attributes such as a name of the encryption object, an activation date of the encryption object, an expiration date of the encryption object, a size of the encryption object, user groups associated with the encryption object, a version of the encryption object, a roll over date of the encryption object, a renewal date of the encryption object and so on. In some embodiments, the values of these attributes may be stored as part of the metadata information for that encryption object.

In some examples, metadata information may also include, without limitation, when the encryption object can be made available for use, when the encryption object should be revoked from use by users of the encryption object, the number of days that the encryption object will be made available before it automatically rolls over into a new version of that encryption object, and the like. In some embodiments, the metadata information may be derived from information stored in the application policy related to the application.

Encryption object metadata extraction engine 1738 may then be configured to identify one or more attributes associated with the encryption objects based on the extracted metadata information. For instance, in an embodiment, encryption object metadata extraction engine 1738 may be configured to identify attributes such as a name of the encryption object, an activation date of the encryption object, an expiration date of the encryption object, a size of the encryption object, user groups associated with the encryption object, a version of the encryption object, a roll over date of the encryption object, a renewal date of the encryption object and so on from the extracted metadata information.

By identifying and/or exposing attributes related to encryption objects that represent only non-secure information related to the encryption objects, the disclosed alert and monitoring service enables secure and/or private information related to the encryption objects to be protected from unwanted actions of unauthorized users who wish to utilize the services of the data encryption service. Such actions may include, for instance, the unauthorized use, disclosure, disruption and/or modification of secure information related to the encryption objects by unauthorized users of the system. Secure information may include, for instance, a key length and/or an encryption strength related to an encryption key. Secure information may include, for example, a digital signature of a digital (security) certificate, a private key used to sign into the certificate, a certificate signature algorithm used for encryption, and so on.

Upon identifying the attributes as described above, monitoring and alert engine 1740 may be configured to monitor the identified attributes. In some examples, monitoring and alert engine 1740 may be configured to monitor the attributes by generating a set of rules that may be applied to the attributes. In other examples, monitoring and alert engine 1740 may be configured to receive a definition of the rules from a user (e.g., a system administrator) of the data encryption service. The rules define a set of one or more conditions that can be applied on the attributes which when satisfied, can trigger the generation of an alert related to the attributes. For example, monitoring and alert engine 1740 could generate and/or receive a definition for a rule for an attribute, such as a roll over date, for an encryption key. The rule could specify a condition that indicates that the encryption key has to be rolled over (i.e., a new key has to be created) if the age of the encryption key is greater than a pre-determined value. In other examples, monitoring and alert engine 1740 could generate a rule that specifies that an encryption object should be revoked from use by users of the encryption object after a pre-specified number of days, a rule that specifies the number of days that an encryption object should be made available before it automatically rolls over into a new version of that encryption object, and so on. The monitoring and alert engine 1740 may be configured to execute the set of rules on a periodic basis, at pre-determined intervals of time. The pre-determined intervals of time can be configured by an administrator of the data encryption service or be automatically determined by the data encryption service, in alternate embodiments.

Monitoring and alert engine 1740 may then be configured to generate an alert when one or more conditions specified by the rules are satisfied and transmit the alert to a user of the service provider system. For instance, the user may be a system administrator of application hosting system 1710 that hosts the application that uses the encryption object. In some embodiments, the alert generated by monitoring and alert engine 1740 may be transmitted to a user via alert UI 1742. For instance, a user (e.g., a system administrator) of application hosting system 1710 may access the alert UI via a browser application executed by the application hosting system to view alerts related to the encryption objects for applications hosted by, provided by, or managed by the application hosting system. For example, an alert triggered by monitoring and alert engine 1740 for the expiration of an encryption object such as an encryption key and/or a certificate can include options to renew the key or the certificate. In certain examples, monitoring and alert engine 1740 may also be configured to generate alerts when an encryption object is found to be in violation of an application policy defined for an application associated with the encryption object.

In some embodiments, the alert transmitted by monitoring and alert engine 1740 may include a "one click" renewal option which sends a request to the local issuing authority (e.g., system administrator of the application hosting system) to issue a renewed encryption object. In some embodiments, where the certificate issuing authority is a third party system, a "one click" renewal option can send a renewal request to the third party issuing authority through the alert UI interface. Similarly, monitoring and alert engine 1740 may trigger an alert for encryption key expiration that can include a "one click" roll-over option, which automatically generates a new encryption key, decrypts the data using the expiring encryption key, and encrypts the data with the new encryption key.

In some embodiments, monitoring and alert engine 1740 may transmit the alerts to the users of the service provider system over communication network 1708. The alerts may be transmitted over any communication channel using various applications such as Internet-related apps, e-mail, short message service (SMS) applications, and may use various other communication protocols.

Figure 18:
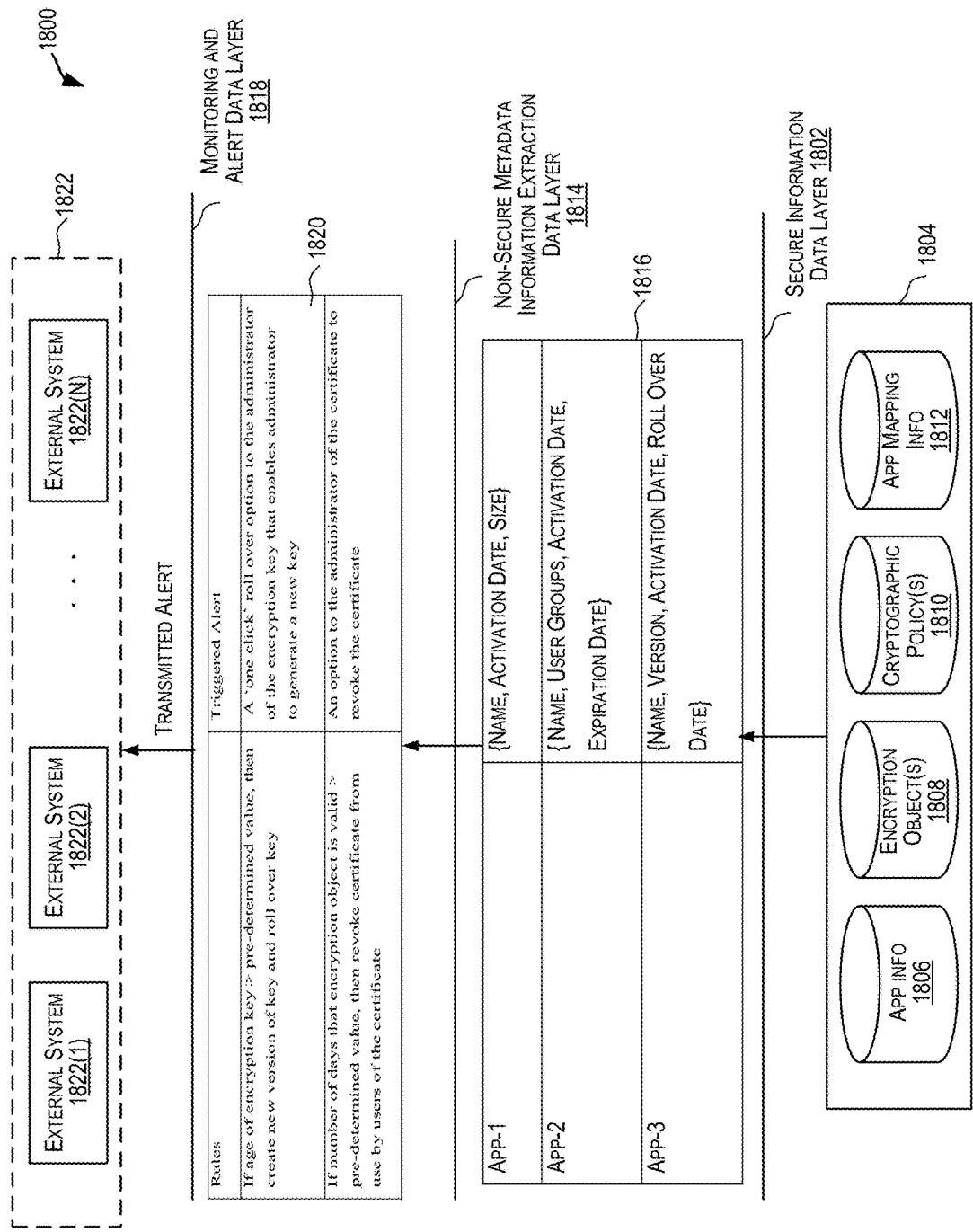
FIG. 18 depicts an environment 1800 in which the alert and monitoring service of the service provider system described in FIG. 17 can be implemented, in accordance with an embodiment of the present disclosure.

FIG. 18 depicts an environment 1800 in which the alert and monitoring service of the service provider system described in FIG. 17 can be implemented, in accordance with an embodiment of the present disclosure. In an embodiment, the alert and monitoring service can be implemented as a logical technology stack that includes a secure information data layer 1802, a non-secure metadata information extraction data layer 1814, and a monitoring and alert data layer 1818. These data layers can be implemented using hardware, software, or a combination thereof. Secure information data layer 1802 may be configured to provide access to secure information related to applications provided by, hosted by, or managed by external systems 1822. In an embodiment, secure information data layer 1802 may be configured to store the secure information in one or more data stores 1804. In an example, data stores 1804 may include an application information data store 1806, an encryption objects data store 1808, a cryptographic policy data store 1810, and an application mapping information data store 1812. Application information data store 1806, encryption objects data store 1808, cryptographic policy data store 1810, and application mapping information data store 1812 may be the same or similar to data stores 114, 116, 118, and 120 described in FIG. 2. As such, secure information stored in data stores 1804 may include, for instance, information about applications, information about encryption objects (e.g., encryption keys and/or certificates) used by the applications, information about cryptographic policies used to encrypt the applications and application mapping information. Application mapping information may include, for instance, information that associates an application to its application policy, its cryptographic policy, and its encryption object.

Non-secure metadata information extraction data layer 1814 may be configured to extract metadata information related to the encryption objects from data stores 1804 and identify one or more attributes associated with the encryption objects based on the extracted metadata information. As described above, metadata information may represent non-secure information related to the encryption objects. For instance, in the example shown in FIG. 18, non-secure metadata information extraction data layer 1814 may identify a first set of attributes for a first application App-1, a second set of attributes for a second application App-2, and a third set of attributes for a third application App-3 from the extracted metadata information stored in data stores 1804. In this example, the first set of attributes for the first application may include the name of the encryption object, the activation date of the encryption object and the size of the encryption object. The second set of attributes for the second application may include the name of the encryption object, user groups associated with the encryption object, the activation date of the encryption object, and the expiration date of the encryption object. The third set of attributes for the third application may include the name of the encryption object, the version of the encryption object, the activation date of the encryption object, and the roll over date of the encryption object. The first set of attributes, the second set of attributes, and the third set of attributes identified by non-secure metadata information extraction data layer 1814 are exemplary illustrations of the types of attributes that may be identified by data layer 1814 from the extracted metadata information. In alternate embodiments, data layer 1814 may be configured to identity fewer or more attributes for fewer or more applications provided by external systems 1822.

Monitoring and alert data layer 1818 may be configured to generate a set of rules that may be applied to the attributes. As noted above, the rules define a set of one or more conditions that may be applied to the attributes which when satisfied trigger the generation of one or more alerts related to the encryption objects. Monitoring and alert layer 1818 may be configured to execute the rules at pre-determined intervals of time. The pre-determined intervals of time may be configured by an administrator of the service provider system, in some examples, or automatically determined by the service provider system, in other examples.

For instance, per the example shown in FIG. 18, monitoring and alert data layer 1818 may be configured to generate a first rule for a first attribute (e.g., roll over date) for an encryption object (e.g., encryption key) for an application (e.g., app-1) that specifies a condition that if the age of the encryption key is greater than 60 days (pre-determined value), then a new version of the key is to be created and the key should be rolled over. When this condition specified by the first rule is satisfied, monitoring and alert data layer 1818 may be configured to trigger the generation of an alert. In this case, the alert that is triggered by monitoring and alert data layer 1818 may include the transmission of a 'one click' roll over option to an administrator of the encryption key to enable the administrator to generate a new key. For instance, monitoring and alert data layer 1818 may be configured to transmit the alert via alert UI (e.g., 1742) discussed in relation to FIG. 17 to the administrator of the encryption key in external system 1822.

Similarly, monitoring and alert data layer 1818 may be configured to generate a second rule for a second attribute (e.g., number of days that the encryption object is valid) for an encryption object (e.g., certificate) for an application (e.g., app-2) that specifies a condition that if the number of days that the certificate has been used by users of the certificate is greater than a pre-determined value, then the certificate is no longer valid and should be revoked from use for users of the encryption object. When this condition specified by the second rule is satisfied, monitoring and alert data layer 1818 may be configured to trigger the generation of an alert. In this case, the alert that is triggered by monitoring and alert data layer 1818 may include the transmission of an option to an administrator of the encryption object to revoke the certificate. The generation of rules and the transmission of alerts related to encryption objects by monitoring and alert data layer 1818 described above are for illustrative purposes. In other embodiments, monitoring and alert data layer 1818 may be configured to generate different, more or fewer rules for different attributes associated with different encryption objects used by different applications.

External systems 1822 may be the same as or similar to application hosting systems 1710 described in FIG. 17. For instance, external systems 1822 may represent organizations, third party systems, or cloud-service providers that provide, manage, or host a variety of resources such as software products, applications (e.g., cloud-based applications, enterprise applications, or any other applications), cloud services, various types of data (e.g., networked files, directory information, databases, or the like) and other resources. External systems 1822 may be implemented or included in a computing system. External systems 1822 may be implemented in hardware, firmware, software, or combinations thereof. External systems 1822 may be implemented in a computing device, such as a PDA, a tablet computer, a laptop computer, a desktop computer, a wearable computer, a pager, etc. External systems 1822 can be implemented using one or more memory storage devices and one or more processors. A memory storage device can be accessible to the processor(s) and can include instructions stored thereon which, when executed by the processor(s), cause the processor(s) to implement one or more operations disclosed herein.

Figure 19:
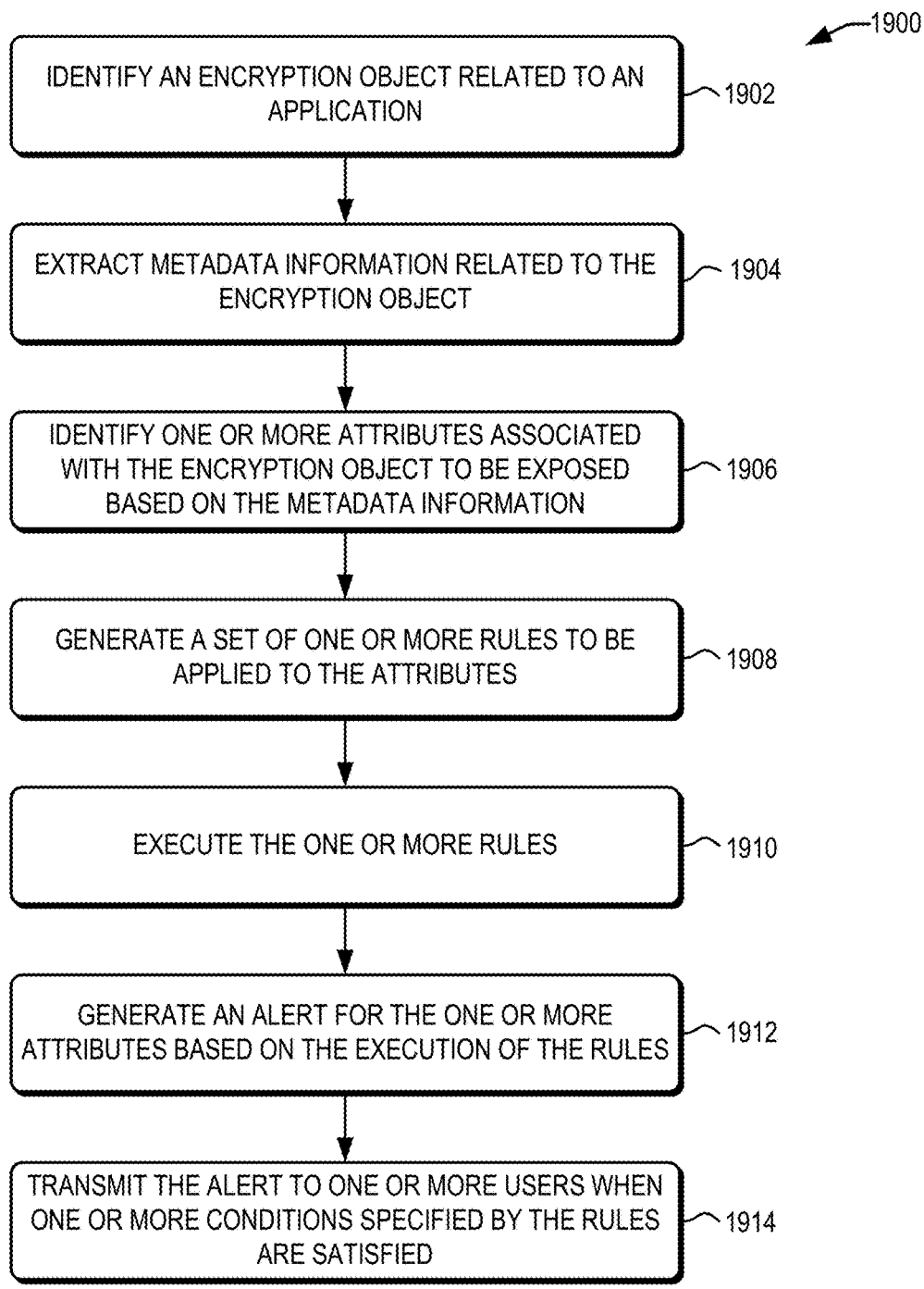
FIG. 19 illustrates an example flow diagram showing process 1900 for generating alerts related to an encryption object, in accordance with an embodiment of the present disclosure.

FIG. 19 illustrates an example flow diagram showing process 1900 for generating alerts related to an encryption object, in accordance with an embodiment of the present disclosure. The process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 19 illustrates an example flow diagram showing process 1900 illustrating the operations performed by a monitoring and alert service provided by the data encryption service, in accordance with one embodiment of the present disclosure. In some aspects, the process 1900 of FIG. 19 may be performed by modules 1738, 1740 and 1742 of data encryption service 1704 shown in FIG. 17. The process 1900 may begin at 1902 when an encryption object related to an application is identified. The encryption object may include, for instance, an encryption key or a digital certificate used to secure information in the application. At 1904, the process 1900 may include extracting metadata information related to the encryption object. As noted above, metadata information may represent non-secure information related to the encryption objects. At 1096, the process 1900 may include identifying one or more attributes associated with the encryption object to be exposed based on the metadata information. As noted above, the attributes may include a name of the encryption object, an activation date of the encryption object, an expiration date of the encryption object, a size of the encryption object, user groups associated with the encryption object, a version of the encryption object, a roll over date of the encryption object, a renewal date of the encryption object and so on.

At 1908, the process 1900 may include generating a set of one or more rules that may be applied to the identified attributes. As noted above, the rules may define a set of one or more conditions that can be applied on the attributes which when satisfied, trigger the generation of an alert related to the attributes. At 1910, the process 1900 may include executing the rules. At 1912, the process 1900 may include generating an alert for the attributes based on the execution of the rules. In some embodiments, at 1914, the process 1900 may include transmitting an alert to one or more users when one or more conditions specified by the rules are satisfied.

Computing Environments

Figure 20:
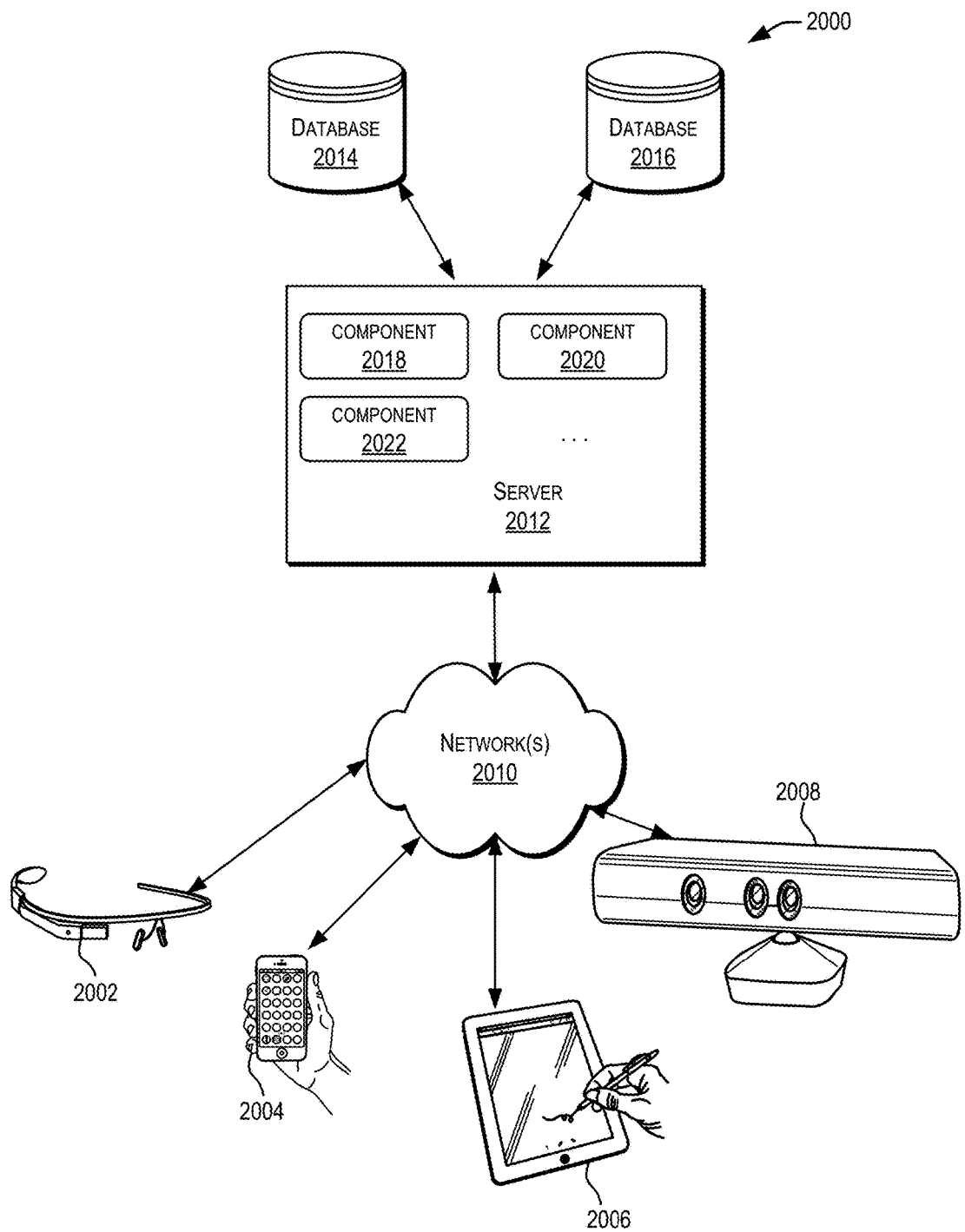
FIG. 20 depicts a simplified diagram of a distributed system 2000 for implementing an embodiment of the present disclosure.

FIG. 20 depicts a simplified diagram of a distributed system 2000 for implementing an embodiment of the present disclosure. In the illustrated embodiment, distributed system 2000 includes one or more client computing devices 2002, 2004, 2006, and 2008, which are configured to execute and operate a client application such as a web browser, proprietary client (e.g., Oracle Forms), or the like over one or more network(s) 2010. Server 2012 may be communicatively coupled with remote client computing devices 2002, 2004, 2006, and 2008 via network 2010.

In various embodiments, server 2012 may be adapted to run one or more services or software applications such as services and applications that may perform data encryption services. In certain embodiments, server 2012 may also provide other services or software applications can include non-virtual and virtual environments. In some embodiments, these services may be offered as web-based or cloud services or under a Software as a Service (SaaS) model to the users of client computing devices 2002, 2004, 2006, and/or 2008. Users operating client computing devices 2002, 2004, 2006, and/or 2008 may in turn utilize one or more client applications to interact with server 2012 to utilize the services provided by these components.

In the configuration depicted in FIG. 20, software components 2018, 2020 and 2022 of system 2000 are shown as being implemented on server 2012. In other embodiments, one or more of the components of system 2000 and/or the services provided by these components may also be implemented by one or more of the client computing devices 2002, 2004, 2006, and/or 2008. Users operating the client computing devices may then utilize one or more client applications to use the services provided by these components. These components may be implemented in hardware, firmware, software, or combinations thereof. It should be appreciated that various different system configurations are possible, which may be different from distributed system 2000. The embodiment shown in FIG. 20 is thus one example of a distributed system for implementing an embodiment system and is not intended to be limiting.

Client computing devices 2002, 2004, 2006, and/or 2008 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2010.

Although distributed system 2000 in FIG. 20 is shown with four client computing devices, any number of client computing devices may be supported. Other devices, such as devices with sensors, etc., may interact with server 2012.

Network(s) 2010 in distributed system 2000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 2010 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2012 can include one or more virtual machines running virtual operating systems, or other computing architectures involving virtualization. One or more flexible pools of logical storage devices can be virtualized to maintain virtual storage devices for the server. Virtual networks can be controlled by server 2012 using software defined networking. In various embodiments, server 2012 may be adapted to run one or more services or software applications described in the foregoing disclosure. For example, server 2012 may correspond to a server for performing processing as described above according to an embodiment of the present disclosure.

Server 2012 may run an operating system including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2012 may include one or more applications to analyze and consolidate data feeds and/or event updates received from users of client computing devices 2002, 2004, 2006, and 2008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2012 may also include one or more applications to display the data feeds and/or real-time events via one or more display devices of client computing devices 2002, 2004, 2006, and 2008.

Distributed system 2000 may also include one or more databases 2014 and 2016. These databases may provide a mechanism for storing information such as application policies, cryptographic policies, encryption objects, and application information used by embodiments of the present disclosure. Databases 2014 and 2016 may reside in a variety of locations. By way of example, one or more of databases 2014 and 2016 may reside on a non-transitory storage medium local to (and/or resident in) server 2012. Alternatively, databases 2014 and 2016 may be remote from server 2012 and in communication with server 2012 via a network-based or dedicated connection. In one set of embodiments, databases 2014 and 2016 may reside in a storage-area network (SAN). Similarly, any necessary files for performing the functions attributed to server 2012 may be stored locally on server 2012 and/or remotely, as appropriate. In one set of embodiments, databases 2014 and 2016 may include relational databases, such as databases provided by Oracle that are adapted to store, update, and retrieve data in response to SQL-formatted commands.

Figure 21:
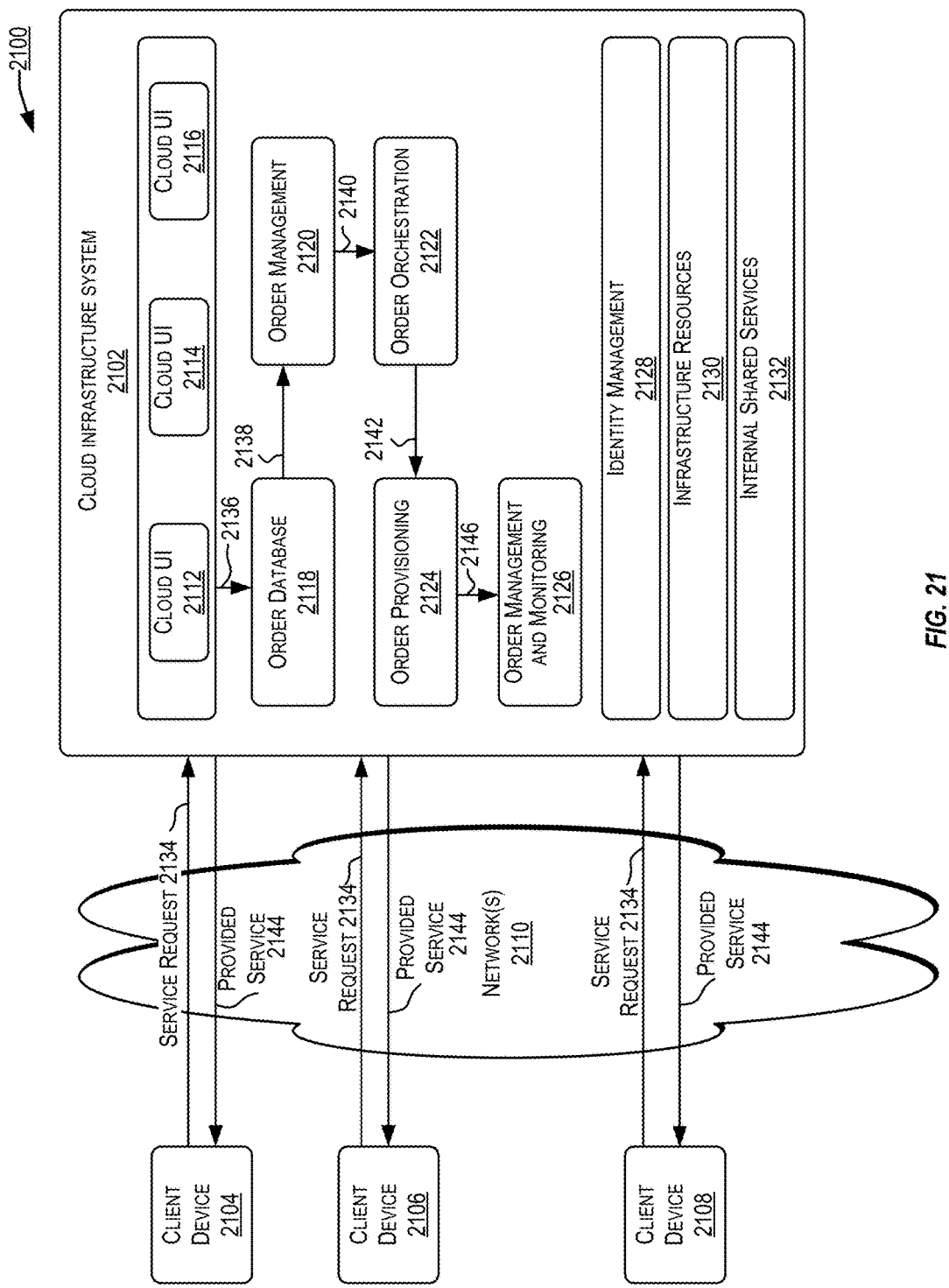
FIG. 21 is a simplified block diagram of one or more components of a system environment 2100 in which the data encryption services may be offered as cloud services, in accordance with an embodiment of the present disclosure.

In some embodiments, the data encryption service described above may be included or implemented in a cloud environment to perform the data encryption of applications. FIG. 21 is a simplified block diagram of one or more components of a system environment 2100 in which the data encryption services may be offered as cloud services, in accordance with an embodiment of the present disclosure. In the illustrated embodiment in FIG. 21, system environment 2100 includes one or more client computing devices 2104, 2106, and 2108 that may be used by users to interact with a cloud infrastructure system 2102 that provides cloud services, including services for performing data encryption. Cloud infrastructure system 2102 may comprise one or more computers and/or servers that may include those described above for server 2012.

It should be appreciated that cloud infrastructure system 2102 depicted in FIG. 21 may have other components than those depicted. Further, the embodiment shown in FIG. 21 is only one example of a cloud infrastructure system that may incorporate an embodiment of the disclosure. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for client computing devices 2002, 2004, 2006, and 2008. Client computing devices 2104, 2106, and 2108 may be configured to operate a client application such as a web browser, a proprietary client application (e.g., Oracle Forms), or some other application, which may be used by a user of the client computing device to interact with cloud infrastructure system 2102 to use services provided by cloud infrastructure system 2102. Although exemplary system environment 2100 is shown with three client computing devices, any number of client computing devices may be supported. Other devices such as devices with sensors, etc. may interact with cloud infrastructure system 2102.

Network(s) 2110 may facilitate communications and exchange of data between client computing devices 2104, 2106, and 2108 and cloud infrastructure system 2102. Each network may be any type of network familiar to those skilled in the art that can support data communications using any of a variety of commercially-available protocols, including those described above for network(s) 2110.

In certain embodiments, services provided by cloud infrastructure system 2102 may include a host of services that are made available to users of the cloud infrastructure system on demand. In addition to services related to managing the data encryption for applications, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2102 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2102 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services (e.g., owned by Oracle Corporation) and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform, and other resources.

In some embodiments, resources in cloud infrastructure system 2102 may be shared by multiple users and dynamically re-allocated per demand. Additionally, resources may be allocated to users in different time zones. For example, cloud infrastructure system 2102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 to enable provision of services by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2102, and the like.

In one embodiment, as depicted in FIG. 21, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In an exemplary operation, at step 2134, a customer using a client device, such as client computing devices 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI) such as cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

At step 2136, the order information received from the customer may be stored in an order database 2118. If this is a new order, a new record may be created for the order. In one embodiment, order database 2118 can be one of several databases operated by cloud infrastructure system 2118 and operated in conjunction with other system elements.

At step 2138, the order information may be forwarded to an order management module 2120 that may be configured to perform billing and accounting functions related to the order, such as verifying the order, and upon verification, booking the order.

At step 2140, information regarding the order may be communicated to an order orchestration module 2122 that is configured to orchestrate the provisioning of services and resources for the order placed by the customer. In some instances, order orchestration module 2122 may use the services of order provisioning module 2124 for the provisioning. In certain embodiments, order orchestration module 2122 enables the management of business processes associated with each order and applies business logic to determine whether an order should proceed to provisioning.

As shown in the embodiment depicted in FIG. 21, at step 2142, upon receiving an order for a new subscription, order orchestration module 2122 sends a request to order provisioning module 2124 to allocate resources and configure resources needed to fulfill the subscription order. Order provisioning module 2124 enables the allocation of resources for the services ordered by the customer. Order provisioning module 2124 provides a level of abstraction between the cloud services provided by cloud infrastructure system 2100 and the physical implementation layer that is used to provision the resources for providing the requested services. This enables order orchestration module 2122 to be isolated from implementation details, such as whether or not services and resources are actually provisioned on the fly or pre-provisioned and only allocated/assigned upon request.

At step 2144, once the services and resources are provisioned, a notification may be sent to the subscribing customers indicating that the requested service is now ready for use. In some instance, information (e.g. a link) may be sent to the customer that enables the customer to start using the requested services.

At step 2146, a customer's subscription order may be managed and tracked by an order management and monitoring module 2126. In some instances, order management and monitoring module 2126 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2100 may include an identity management module 2128 that is configured to provide identity services, such as access management and authorization services in cloud infrastructure system 2100. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

Figure 22:
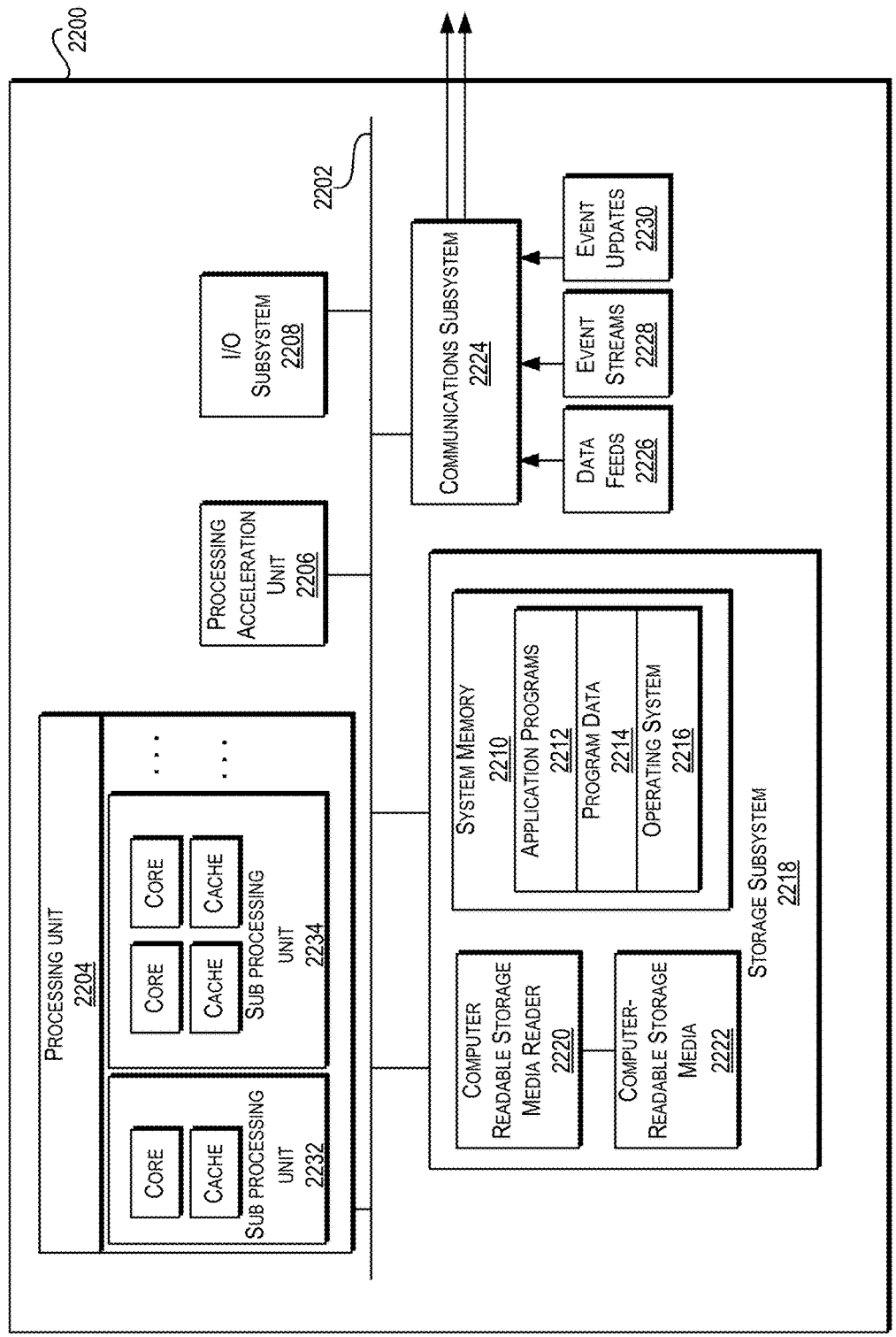
FIG. 22 illustrates an exemplary computer system 2200 that may be used to implement an embodiment of the present disclosure.

FIG. 22 illustrates an exemplary computer system 2200 that may be used to implement an embodiment of the present disclosure. In some embodiments, computer system 2200 may be used to implement any of the various servers and computer systems described above. As shown in FIG. 22, computer system 2200 includes various subsystems including a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 may include tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2204 controls the operation of computer system 2200 and may comprise one or more processing units 2232, 2234, etc. A processing unit may include be one or more processors, including single core or multicore processors, one or more cores of processors, or combinations thereof. In some embodiments, processing subsystem 2204 can include one or more special purpose co-processors such as graphics processors, digital signal processors (DSPs), or the like. In some embodiments, some or all of the processing units of processing subsystem 2204 can be implemented using customized circuits, such as application specific integrated circuits (ASICs), or field programmable gate arrays (FPGAs).

In some embodiments, the processing units in processing subsystem 2204 can execute instructions stored in system memory 2210 or on computer readable storage media 2222. In various embodiments, the processing units can execute a variety of programs or code instructions and can maintain multiple concurrently executing programs or processes. At any given time, some or all of the program code to be executed can be resident in system memory 2210 and/or on computer-readable storage media 2222 including potentially on one or more storage devices. Through suitable programming, processing subsystem 2204 can provide various functionalities described above for managing security artifacts.

In certain embodiments, a processing acceleration unit 2206 may be provided for performing customized processing or for off-loading some of the processing performed by processing subsystem 2204 so as to accelerate the overall processing performed by computer system 2200.

I/O subsystem 2208 may include devices and mechanisms for inputting information to computer system 2200 and/or for outputting information from or via computer system 2200. In general, use of the term "input device" is intended to include all possible types of devices and mechanisms for inputting information to computer system 2200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2218 provides a repository or data store for storing information that is used by computer system 2200. Storage subsystem 2218 provides a tangible non-transitory computer-readable storage medium for storing the basic programming and data constructs that provide the functionality of some embodiments. Software (programs, code modules, instructions) that when executed by processing subsystem 2204 provide the functionality described above may be stored in storage subsystem 2218. The software may be executed by one or more processing units of processing subsystem 2204. Storage subsystem 2218 may also provide a repository for storing data used in accordance with the present disclosure.

Storage subsystem 2218 may include one or more non-transitory memory devices, including volatile and non-volatile memory devices. As shown in FIG. 22, storage subsystem 2218 includes a system memory 2210 and a computer-readable storage media 2222. System memory 2210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2200, such as during start-up, may typically be stored in the ROM. The RAM typically contains data and/or program modules that are presently being operated and executed by processing subsystem 2204. In some implementations, system memory 2210 may include multiple different types of memory, such as static random access memory (SRAM) or dynamic random access memory (DRAM).

By way of example, and not limitation, as depicted in FIG. 22, system memory 2210 may store application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2222 may store programming and data constructs that provide the functionality of some embodiments. Software (programs, code modules, instructions) that when executed by processing subsystem 2204 a processor provide the functionality described above may be stored in storage subsystem 2218. By way of example, computer-readable storage media 2222 may include non-volatile memory such as a hard disk drive, a magnetic disk drive, an optical disk drive such as a CD ROM, DVD, a Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2222 may provide storage of computer-readable instructions, data structures, program modules, and other data for computer system 2200.

In certain embodiments, storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for storing computer-readable information.

In certain embodiments, computer system 2200 may provide support for executing one or more virtual machines. Computer system 2200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2200. Accordingly, multiple operating systems may potentially be run concurrently by computer system 2200. Each virtual machine generally runs independently of the other virtual machines.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to establish a communication channel to one or more client computing devices via the Internet for receiving and sending information from and to the client computing devices.

Communication subsystem 2224 may support both wired and/or wireless communication protocols. For example, in certain embodiments, communications subsystem 2224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1102.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

Communication subsystem 2224 can receive and transmit data in various forms. For example, in some embodiments, communications subsystem 2224 may receive input communication in the form of structured and/or unstructured data feeds 2226, event streams 2228, event updates 2230, and the like. For example, communications subsystem 2224 may be configured to receive (or send) data feeds 2226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2224 may be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2200 depicted in FIG. 22 is intended only as a specific example. Many other configurations having more or fewer components than the system depicted in FIG. 22 are possible. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A data encryption system comprising:
a data store configured to store information related to a plurality of applications hosted in a cloud computing environment; and
one or more computing devices configured to provide one or more data encryption services, wherein at least one computing device from the one or more computing devices comprises:
one or more processors, and
a memory having stored thereon a set of instructions that, when executed by the one or more processors, cause the one or more processors to:
identify an encryption object used to secure data within an application of the plurality of applications;
extract metadata information from the encryption object, wherein the metadata information comprises a corresponding value for each of one or more attributes of the encryption object and each of the corresponding values represents non-secure information about the encryption object;
identify the one or more attributes of the encryption object based at least in part on the metadata information;
expose the one or more attributes and each corresponding value for generation of a set of one or more rules;
generate the set of one or more rules defining a set of one or more conditions to be applied to the corresponding values of the one or more attributes;
generate an alert for the one or more attributes based at least in part on an execution of the set of one or more rules; and
transmit the alert to one or more users using one or more communication channels.

2. The system of claim 1, wherein the encryption object comprises at least one of an encryption key or a digital certificate used to secure the application.

3. The system of claim 1, wherein the alert comprises a selectable renewal option and wherein the set of instructions comprise further instructions that, when executed by the one or more processors, cause the one or more processors to:
receive an indication that the selectable renewal option was selected by a user; and
request, in response to receiving the indication, a renewed encryption object to replace the encryption object.

4. The system of claim 1, wherein the set of instructions comprise further instructions that, when executed by the one or more processors, cause the one or more processors to:
extract the metadata information related to the encryption object based at least in part on an application policy related to the application.

5. The system of claim 1, wherein the one or more attributes associated with the encryption object comprise at least one of a name of the encryption object, an activation date of the encryption object, an expiration date of the encryption object, a size of the encryption object, user groups associated with the encryption object, a version of the encryption object, a roll over date of the encryption object, and a renewal date of the encryption object.

6. The system of claim 1, wherein the set of instructions comprise further instructions that, when executed by the one or more processors, cause the one or more processors to:
execute the set of one or more rules periodically.

7. The system of claim 1, wherein the set of instructions comprise further instructions that, when executed by the one or more processors, cause the one or more processors to:
receive a definition of the set of one or more rules based at least in part on an input received from a user of the system.

8. The system of claim 1, wherein the set of instructions comprise further instructions that, when executed by the one or more processors, cause the one or more processors to:
generate an alert for the encryption object based at least in part on identifying a violation of an application policy defined for the application associated with the encryption object.

9. The system of claim 1, wherein the set of instructions comprise further instructions that, when executed by the one or more processors, cause the one or more processors to:

transmit the alert via at least one of email, Instant Messaging (IM), Short Message Service (SMS), Multimedia Message Service (MMS), and Application-to-Application messaging.

10. A method comprising:

identifying an encryption object used to secure data within an application of a plurality of applications, wherein the plurality of applications are hosted in a cloud computing environment;

extracting metadata information from the encryption object, wherein the metadata information comprises a corresponding value for each of one or more attributes of the encryption object and each of the corresponding values represents non-secure information about the encryption object;

identifying the one or more attributes of the encryption object based at least in part on the metadata information;

exposing the one or more attributes and each corresponding value for generation of a set of one or more rules;

generating the set of one or more rules defining a set of one or more conditions to be applied to the corresponding values of the one or more attributes;

generating an alert for the one or more attributes based at least in part on an execution of the set of one or more rules; and transmitting the alert to one or more users, using one or more communication channels.

11. The method of claim 10, wherein the encryption object comprises at least one of an encryption key or a digital certificate used to secure the application.

12. The method of claim 10, wherein the alert comprises a selectable renewal option, the method further comprising:

receiving an indication that the selectable renewal option was selected by a user; and requesting, in response to receiving the indication, a renewed encryption object to replace the encryption object.

13. The method of claim 10, further comprising extracting the metadata information related to the encryption object based at least in part on an application policy related to the application.

14. The method of claim 10, wherein the one or more attributes associated with the encryption object to be exposed comprise at least one of a name of the encryption object, an activation date of the encryption object, an expiration date of the encryption object, a size of the encryption object, user groups associated with the encryption object, a version of the encryption object, a roll over date of the encryption object, and a renewal date of the encryption object.

15. The method of claim 10, further comprising executing the set of one or more rules periodically.

16. The method of claim 10 further comprising receiving a definition of the set of one or more rules based at least in part on an input received from a user.

17. The method of claim 10 further comprising generating an alert for the encryption object based at least in part on identifying a violation of an application policy defined for the application associated with the encryption object.

18. One or more non-transitory computer-readable media storing computer-executable instructions executable by one or more processors, the computer-executable instructions comprising:

instructions that cause the one or more processors to identify an encryption object used to secure data within an application of a plurality of applications, wherein the plurality of applications are hosted in a cloud computing environment;

instructions that cause the one or more processors to extract metadata information from the encryption object, wherein the metadata information comprises a corresponding value for each of one or more attributes of the encryption object and each of the corresponding values represents non-secure information about the encryption object;

instructions that cause the one or more processors to identify the one or more attributes of the encryption object based at least in part on the metadata information;

instructions that cause the one or more processors to expose the one or more attributes and each corresponding value for generation of a set of one or more rules;

instructions that cause the one or more processors to generate the set of one or more rules defining a set of one or more conditions to be applied to the corresponding values of the one or more attributes;

instructions that cause the one or more processors to generate an alert for the one or more attributes based at least in part on an execution of the set of one or more rules; and instructions that cause the one or more processors to transmit the alert to one or more users, using one or more communication channels.

19. The computer-readable media of claim 18, wherein the alert comprises a selectable renewal option and wherein the computer-executable instructions further comprise:

instructions that cause the one or more processors to receive an indication that the selectable renewal option was selected by a user; and instructions that cause the one or more processors to request, in response to receiving the indication, a renewed encryption object to replace the encryption object.

20. The computer-readable media of claim 18, wherein the computer-executable instructions further comprise instructions that cause the one or more processors to transmit the alert via at least one of email, Instant Messaging (IM), Short Message Service (SMS), Multimedia Message Service (MMS), and Application-to-Application messaging.

* * * * *

UNITED STATES PATENT AND TRADEMARK OFFICE
CERTIFICATE OF CORRECTION

PATENT NO. : 10,699,020 B2  
APPLICATION NO. : 15/197463  
DATED : June 30, 2020  
INVENTOR(S) : Agarwal et al.

Page 1 of 1

It is certified that error appears in the above-identified patent and that said Letters Patent is hereby corrected as shown below:

In the Specification

Column 9, Line 32, delete "system" and insert -- system. --, therefor.

Column 15, Line 30, delete "satisfied" and insert -- satisfied. --, therefor.

Column 15, Line 61, delete "thereof" and insert -- thereof. --, therefor.

Column 23, Line 20, after "mapping" delete "in".

Column 39, Line 2, delete "infra-red" and insert -- infrared --, therefor.

In the Claims

Column 51, Lines 6-7, Claim 9, delete "Application- to-Application" and insert -- Application-to-Application --, therefor.

Column 52, Line 56, Claim 20, delete "Application- to-Application" and insert -- Application-to-Application --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*